(12) United States Patent
Leung et al.

(10) Patent No.: US 12,373,142 B2
(45) Date of Patent: *Jul. 29, 2025

(54) METHOD FOR UPDATING STORED INFORMATION AND APPARATUS

(71) Applicant: Huawei Technologies Co., Ltd., Shenzhen (CN)

(72) Inventors: Wai Kong Raymond Leung, Shenzhen (CN); Dongyu Geng, Shenzhen (CN); Qinhui Huang, Shenzhen (CN); Huixiao Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,843

(22) Filed: Feb. 23, 2024

(65) Prior Publication Data
US 2024/0281170 A1 Aug. 22, 2024

Related U.S. Application Data

(63) Continuation of application No. 17/230,056, filed on Apr. 14, 2021, now Pat. No. 11,914,895, which is a (Continued)

(30) Foreign Application Priority Data

May 23, 2019 (CN) .......................... 201910436048.X

(51) Int. Cl.
G06F 3/06 (2006.01)
G06F 11/10 (2006.01)

(52) U.S. Cl.
CPC .......... *G06F 3/0659* (2013.01); *G06F 3/0611* (2013.01); *G06F 3/0619* (2013.01);
(Continued)

(58) Field of Classification Search
CPC .... G06F 3/0659; G06F 3/0611; G06F 3/0619; G06F 3/0625; G06F 3/0673; G06F 11/1076; G06F 11/1044; G06F 2212/403
See application file for complete search history.

(56) References Cited

U.S. PATENT DOCUMENTS 10,521,293 B2 12/2019 Cha et al.
2007/0011578 A1 1/2007 Lewis et al.
(Continued)

FOREIGN PATENT DOCUMENTS

CN 1892611 A 1/2007
CN 101246748 A 8/2008
(Continued)

*Primary Examiner* — Tim T Vo
*Assistant Examiner* — Janice M. Girouard
(74) *Attorney, Agent, or Firm* — Conley Rose, P.C.

(57) ABSTRACT

A method for updating stored information and an apparatus. A controller performs error correction code (ECC) decoding on stored data information based on the stored data information and stored ECC check information to generate an error-corrected codeword, where the error-corrected codeword includes error-corrected data information. The controller generates candidate to-be-written data information based on the error-corrected data information and a data update indication. The controller performs a mask operation on the candidate to-be-written data information based on the stored data information, and writes unmasked content in the candidate to-be-written data information into a memory.

20 Claims, 15 Drawing Sheets

Related U.S. Application Data continuation of application No. PCT/CN2020/078768, filed on Mar. 11, 2020.

(52) U.S. Cl.
CPC .......... *G06F 3/0625* (2013.01); *G06F 3/0673* (2013.01); *G06F 11/1076* (2013.01); *G06F 11/1044* (2013.01); *G06F 2212/403* (2013.01)

(56) References Cited

U.S. PATENT DOCUMENTS

| | | | |
|---|---|---|---|
| 2008/0195919 | A1 | 8/2008 | Park et al. |
| 2014/0177362 | A1* | 6/2014 | O'Connor ............ G11C 7/1009 365/201 |
| 2014/0331101 | A1 | 11/2014 | Chung et al. |
| 2016/0041872 | A1 | 2/2016 | Ku et al. |
| 2017/0147431 | A1 | 5/2017 | West et al. |
| 2017/0161112 | A1 | 6/2017 | Horsnell et al. |
| 2017/0161144 | A1 | 6/2017 | Reed et al. |
| 2019/0221273 | A1* | 7/2019 | Parkinson ........... G06F 12/0246 |

FOREIGN PATENT DOCUMENTS

| | | |
|---|---|---|
| CN | 102339641 A | 2/2012 |
| CN | 106537342 A | 3/2017 |
| CN | 106802837 A | 6/2017 |
| CN | 107068194 A | 8/2017 |
| CN | 107329850 A | 11/2017 |
| CN | 108351820 A | 7/2018 |
| CN | 109524051 A | 3/2019 |
| KR | 20080075750 A | 8/2008 |
| KR | 20160017922 A | 2/2016 |

* cited by examiner

METHOD FOR UPDATING STORED INFORMATION AND APPARATUS

CROSS-REFERENCE TO RELATED APPLICATIONS

This is a continuation of U.S. patent application Ser. No. 17/230,056 filed on Apr. 14, 2021, which is a continuation of International Patent Application No. PCT/CN2020/078768 filed on Mar. 11, 2020, which claims priority to Chinese Patent application Ser. No. 201910436048.X filed on May 23, 2019. All of the aforementioned applications are hereby incorporated by reference in their entireties.

TECHNICAL FIELD

This application relates to the field of communications technologies, and in particular, to a method for updating stored information and an apparatus.

BACKGROUND

In the computer field, a memory is an important part of a computer system. There are a relatively large quantity of types of memories in the computer system, such as a random-access memory (RAM), a flash memory, and a read-only memory (ROM). The RAM is a most common system memory, and a read operation and a write operation may be randomly performed on a storage unit. The RAM may be classified into a static RAM (SRAM) and a dynamic RAM (DRAM) according to a data storage manner.

During use of the memory, bits stored in the memory may be inverted due to impact of a circuit itself or external interference, and consequently stored data is incorrect. Bit inverting means that correct data written into the memory may change after a period of time, and consequently the correct data is changed into incorrect data.

For the foregoing disadvantage of the memory, an error correction code (ECC) check mechanism is currently used to perform error detection and correction on data stored in the memory. Each time data information is written into the memory, ECC check mechanism calculates the data using an ECC encoding algorithm, to generate ECC check information of the data information. The ECC check information of the data information is referred to as ECC check information or check information. When the data information written into the memory is read from the memory, an ECC decoder may perform an error correction operation with reference to the ECC check information using an ECC decoding algorithm, to generate error-corrected data information.

A conventional manner of updating data stored in a memory includes: after reading stored data information and performing ECC decoding on the stored data information, updating the stored data information based on error-corrected data information generated after the ECC decoding; and then, performing ECC encoding on updated data information that includes the ECC error-corrected data information, to generate to-be-written data information and to-be-written ECC check information, and writing the to-be-written data information and the to-be-written ECC check information that are obtained after the encoding into the memory in place of the stored data information and stored ECC check information. Therefore, when data information of a codeword (code-word) stored in a memory is updated, information written into the memory is all data information that is based on the stored codeword read at one time and updated information. However, only a small amount of data (for example, 1 bit or several bits) of the stored codeword in the memory may need to be updated, and a write operation does not need to be performed on most data again. If all data of the codeword is rewritten, power consumption is wasted in a process of performing a write operation, and time required for the write operation is increased.

SUMMARY

Embodiments of this application provide a method for updating stored information and an apparatus, such that when data stored in a memory is updated, only data content different from data information that is of a codeword and that is stored in the memory needs to be written into the memory instead of writing all data content that is of the data information of the codeword and that is stored in the memory, thereby reducing a waste of power consumption during writing and time for performing a write operation.

To achieve the foregoing objective, the embodiments of this application provide the following technical solutions.

According to a first aspect, an embodiment of this application provides a method for updating stored information. A controller performs ECC decoding on stored data information based on the stored data information and stored ECC check information to generate an error-corrected codeword, where the error-corrected codeword includes error-corrected data information. The controller generates candidate to-be-written data information based on the error-corrected data information and a data update indication. The controller performs a mask operation on the candidate to-be-written data information based on the stored data information. The controller writes unmasked content in the candidate to-be-written data information into a memory. According to the method, written data information is the unmasked data content in the candidate to-be-written data information, and masked data content in the candidate to-be-written data information is not written into the memory, thereby reducing power consumption and a latency of a write operation for updating data content. In addition, in the present disclosure, error correction is performed on the stored information before information writing. As such, updated content is based on error-corrected content, thereby ensuring accuracy of the updated content.

In a possible implementation, the data update indication is used to indicate a data location that needs to be updated and that is in the stored data information, and the controller further generates updated data information based on the data update indication. The generating candidate to-be-written data information based on the error-corrected data information and a data update indication includes: generating the candidate to-be-written data information based on the error-corrected data information and the updated data information. According to the method, update can be completed by specifying only the location that needs to be updated, such that the update is more flexible.

In a possible implementation, the generating the candidate to-be-written data information based on the error-corrected data information and the updated data information includes: performing exclusive OR processing on the error-corrected data information and the updated data information, to generate the candidate to-be-written data information. The candidate to-be-written data information is generated through exclusive OR processing, such that the operation is simple.

In a possible implementation, the data update indication is used to indicate updated data content and an updated data location, and the generating candidate to-be-written data information based on the error-corrected data information and a data update indication includes: replacing data content at a same location in the error-corrected data information with the updated data content based on the updated data location. The candidate to-be-written data information is generated by providing another data update indication and performing replacement, such that the update is more flexible.

In a possible implementation, the controller further performs exclusive OR processing on the stored data information and the candidate to-be-written data information, to generate a mask control signal for the candidate to-be-written data information, and performs the mask operation on the candidate to-be-written data information based on the mask control signal for the candidate to-be-written data information. The mask operation is performed, such that less data information is written, thereby reducing writing time and power consumption.

In a possible implementation, the controller combines the stored data information and the stored ECC check information to generate a stored codeword. According to the method, a solution is provided for separately storing the data information and the ECC check information.

In a possible implementation, the controller performs ECC encoding on the candidate to-be-written data information to generate candidate to-be-written ECC check information, and writes the candidate to-be-written ECC check information into the memory. According to the method, the candidate ECC check information is also written into the memory, to help check the updated data information using the ECC check information, thereby ensuring information accuracy.

In a possible implementation, the error-corrected codeword further includes error-corrected ECC check information, and the controller further generates candidate to-be-written ECC check information based on the error-corrected ECC check information and updated ECC check information; and performs a mask operation on the candidate to-be-written ECC check information based on the stored ECC check information, and writes unmasked content in the candidate to-be-written ECC check information into the memory. According to the method, the mask operation is also performed on the candidate to-be-written ECC check information, to reduce writing time and consumption.

In a possible implementation, the controller further performs ECC encoding on the candidate to-be-written data information to generate candidate to-be-written ECC check information, and performs a mask operation on the candidate to-be-written ECC check information based on the stored ECC check information. The controller writes unmasked content in the candidate to-be-written ECC check information into the memory. According to the method, the mask operation is also performed on the candidate to-be-written ECC check information, to reduce writing time and consumption.

In a possible implementation, the generating candidate to-be-written ECC check information based on the error-corrected ECC check information and updated ECC check information includes: performing exclusive OR processing on the error-corrected ECC check information and the updated ECC check information, to generate the candidate to-be-written ECC check information.

In a possible implementation, the controller further performs exclusive OR processing on the candidate to-be-written ECC check information and the stored ECC check information, to generate a mask control signal for the candidate to-be-written ECC check information, and the performing a mask operation on the candidate to-be-written ECC check information based on the stored ECC check information includes: performing the mask operation on the candidate to-be-written ECC check information based on the mask control signal for the candidate to-be-written ECC check information. According to the method, the mask operation is also performed on the candidate to-be-written ECC check information, to reduce writing time and consumption.

According to a second aspect, an embodiment of the present disclosure provides an apparatus. The apparatus includes a controller and a memory. The memory is configured to store data information and ECC check information corresponding to the data information. The controller is configured to perform any step performed by the controller in the first aspect.

According to a third aspect, an embodiment of the present disclosure provides a chip. The chip includes a core processor and a controller. The core processor is configured to exchange data with a memory using the controller. The controller is configured to perform any step performed by the controller in the first aspect.

In a possible implementation, the chip further includes a memory, and the memory is configured to store data information and ECC check information corresponding to the data information.

According to a fourth aspect, an embodiment of the present disclosure provides a controller. The controller includes a processing circuit and a memory interface circuit. The memory interface circuit is configured to provide an interface between the controller and a memory. The processing circuit is configured to interact with the memory via the memory interface circuit, and perform any step performed by the controller in the first aspect.

According to a fifth aspect, an embodiment of the present disclosure provides an apparatus. The apparatus includes a processor and a storage. The storage is configured to store a computer executable instruction. The processor is configured to: when the apparatus runs, execute the computer executable instruction stored in the storage, to enable the apparatus to perform any step performed by the controller in the first aspect.

According to a sixth aspect, a computer-readable storage medium is provided. The computer-readable storage medium stores an instruction, and when the instruction is run on a computer, the computer is enabled to perform the method for updating stored information according to any of the first aspect or the possible implementations of the first aspect.

According to a seventh aspect, an embodiment of the present disclosure provides an apparatus. The apparatus includes an ECC decoder, a candidate information generation module, and a mask control module. The ECC decoder is configured to perform ECC decoding on stored data information based on the stored data information and stored ECC check information, to generate error-corrected data information. The candidate information generation module is configured to generate candidate to-be-written data information based on the error-corrected data information and updated data information. The mask control module performs a mask operation on the candidate to-be-written data information based on the stored data information, such that unmasked content in the candidate to-be-written data information is written into a memory.

According to an eighth aspect, an embodiment of the present disclosure provides a computer program product. When being executed, the computer product is configured to perform the method according to the foregoing aspect.

According to the method in the aspects of the embodiments of the present disclosure, for data content that needs to be updated, after performing error correction on the stored data information, the controller performs exclusive OR processing on the error-corrected data information and the updated data information, and performs the mask operation to generate the written data information, such that the written data information is the unmasked data content in the candidate to-be-written data information, and the masked data content in the candidate to-be-written data information is not written into the memory, thereby reducing power consumption and a latency of a single write operation for updating data content.

These aspects or other aspects of this application are clearer and more comprehensible in the following descriptions of the embodiments.

DESCRIPTION OF EMBODIMENTS

Figure 1:
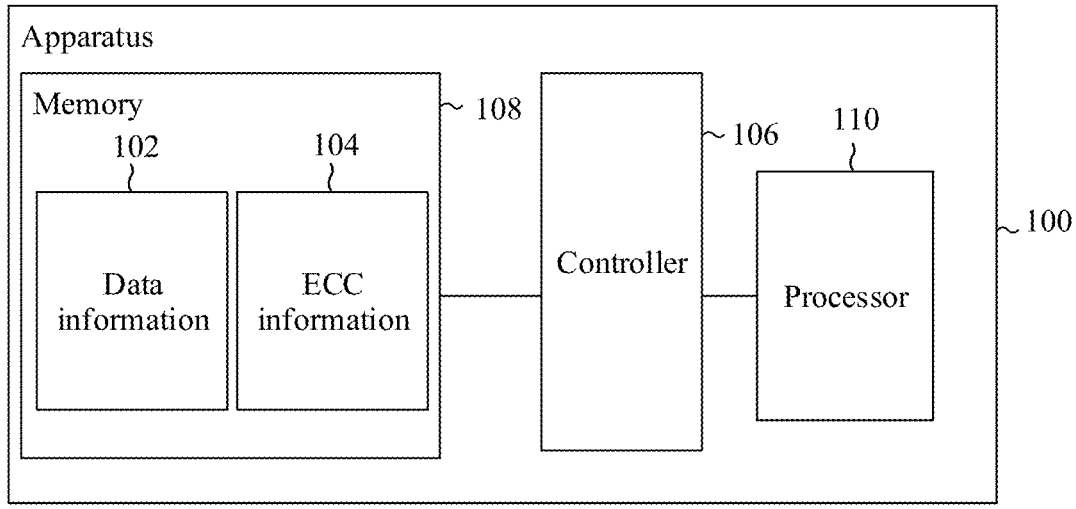
FIG. 1 is a schematic structural diagram of an apparatus according to an embodiment of the present disclosure.

The term "and/or" in this specification describes only an association relationship for describing associated objects and represents that three relationships may exist. For example, A and/or B may represent the following three cases: Only A exists, both A and B exist, and only B exists.

In the embodiments of the present disclosure, the word such as "example" or "for example" is used to represent giving an example, an illustration, or a description. Any embodiment or design scheme described as "example" or "for example" in the embodiments of the present disclosure should not be explained as being more preferred or having more advantages than another embodiment or design scheme. Exactly, use of the word such as "example" or "for example" is intended to present a relative concept in a specific manner.

In the embodiments of the present disclosure, data information is a k-bit data sequence, ECC check information is a p-bit data sequence, and a codeword is an n-bit data sequence, where n bits are equal to k bits plus p bits. In the embodiments of the present disclosure, data content is a value of a specific bit. In the embodiments of the present disclosure, a data location is a location of a bit in data information, ECC check information, or a codeword, such as the first bit or the third bit. Updated data content is a value corresponding to a bit that needs to be updated, for example, values corresponding to the third bit and the fifth bit, such as 0 or 1.

In the embodiments of the present disclosure, in a scenario of partially updating data information stored in a memory, a controller generates error-corrected data information after performing ECC decoding on the data information stored in the memory. The controller generates candidate to-be-written data information based on the error-corrected data information and a data update indication (for example, an updated data location, or updated data content and an updated data location). The controller determines, based on the stored data information and the candidate to-be-written data information, a bit or byte that actually needs to be updated, and writes the determined bit or byte in the candidate to-be-written data information into the memory. According to the method, not all content of the candidate to-be-written data information is written into the memory, thereby reducing power consumption and a latency of a write operation performed when the stored data information is updated.

For example, a codeword $C_e$ that includes ECC check information has 72 bits, and the codeword $C_e$ includes 64-bit data information $D_e$ and 8-bit ECC check information $P_e$. When updating the stored data information $D_e$, for example, updating 1 or 2 bits in the stored data information $D_e$, the controller performs ECC decoding on the stored data information $D_e$ based on the ECC check information $P_e$ to generate error-corrected data information, and then generates 64-bit candidate to-be-written data information $D_n$ based on information of updated 1 or 2 bits and the error-corrected data information. The controller determines, based on the stored data information $D_e$ and the candidate to-be-written data information $D_n$, a bit or byte that actually needs to be updated (for example, values of the updated 1 or 2 bits, or values of the updated 1 or 2 bits and a value of a bit error-corrected during the ECC decoding). Therefore, only the values of the determined 1 or 2 bits (or byte) need to be written into the memory instead of writing all 64-bit content of the entire candidate to-be-written data information $D_n$ into the memory, thereby reducing power consumption and a latency of a write operation.

FIG. 1 is a schematic architectural diagram of an apparatus 100 for updating stored information according to an embodiment of the present disclosure. As shown in FIG. 1, the apparatus 100 may include at least a controller 106, a processor 110, and at least one memory 108. The controller 106 exchanges data with the processor 110 and the memory 108 using a system bus.

In this embodiment, the controller 106 may be integrated with the processor 110 into a same chip, or the controller 106 may be a standalone chip. Alternatively, the controller 106, the processor 110, and the memory 108 may be integrated into a same chip. The controller 106 may control and read/write data information and ECC check information that are stored in the memory. It should be noted that in the apparatus provided in this embodiment of the present disclosure, in addition to the components shown in FIG. 1, the apparatus 100 may include other components such as a communications interface and a disk used as an external storage. This is not limited herein.

The processor 110 provides a computing and processing capability for the controller 106, and can access the memory 108, a cache, and the disk.

The controller 106 is a bus circuit controller configured to control the memory 108 and manage and plan data transmission from the memory 108 to the processor 110. The controller 106 may be implemented using hardware, or may be implemented using software. In actual application, the controller 106 may control necessary logic to write data into the memory 108 or obtain data from the memory 108.

Figure 3:
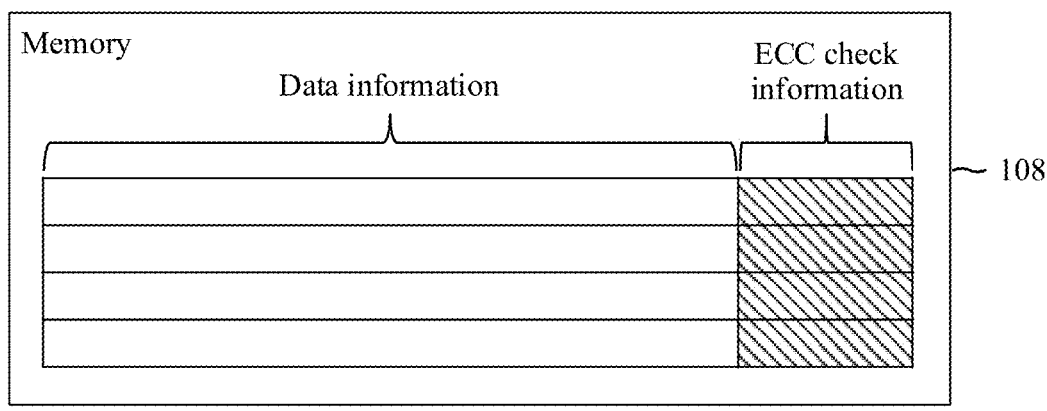
FIG. 3 is a schematic diagram of data information and ECC check information that are stored in a same memory according to an embodiment of this application.
Figure 4:
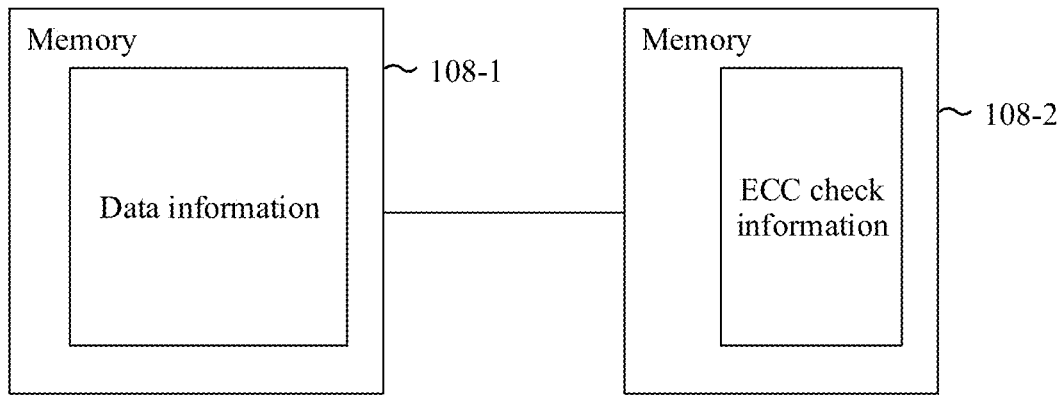
FIG. 4 is a schematic diagram of data information and ECC check information that are separately stored in different memories according to an embodiment of this application.

There are one or more memories 108. The memory 108 is a main storage of the apparatus 100. The memory 108 is usually configured to store various types of software running in an operating system, input and output data, information exchanged with the external storage, and the like. The processor 110 can access the memory 108 using the controller 106, to perform a read operation and a write operation on the memory 108. The one or more memories 108 are configured to store data information, and store ECC check information of the data information. The data information and the ECC check information may be stored in a same memory as shown in FIG. 3, or may be separately stored in different memories as shown in FIG. 4. The memory 108 may be a RAM, a Flash, a ROM, or the like.

Figure 2:
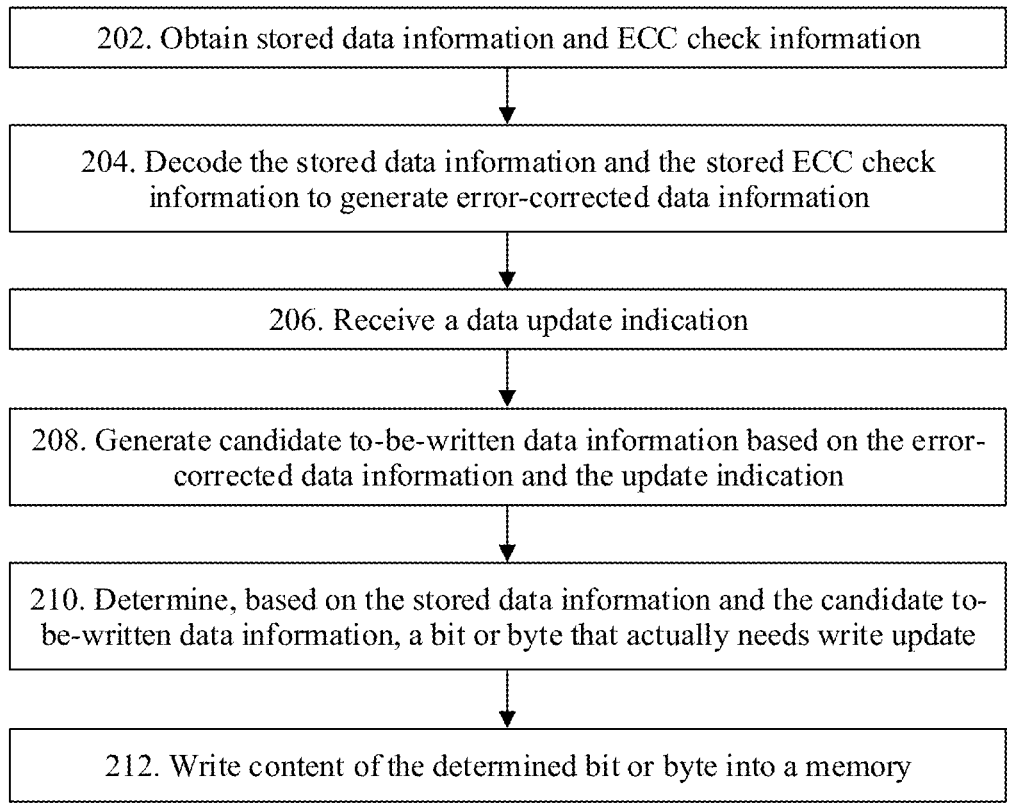
FIG. 2 is a flowchart of a method for updating stored information according to an embodiment of this application.

FIG. 2 is a flowchart of a method for updating stored information according to an embodiment of the present disclosure. A controller that performs the method may be the controller 106 in FIG. 1. The method includes the following steps.

Step 202: The controller 106 obtains data information and ECC check information that are stored in a memory 108.

The data information and the ECC check information may be stored in one memory 108, or may be stored in different memories 108.

Step 204: The controller 106 performs ECC decoding on the stored data information and the stored ECC check information to generate error-corrected data information.

Step 206: The controller 106 receives a data update indication to update the data information stored in the memory 108.

The data update indication is used to indicate a data location that needs to be updated (for example, indicate a specific bit that needs to be updated) in the stored data information. Alternatively, the data update indication is used to indicate updated data content and an updated data location (for example, indicate a bit location and value that need to be updated).

Step 208: The controller 106 generates candidate to-be-written data information based on the error-corrected data information and the data update indication.

The controller 106 may perform exclusive OR processing on the error-corrected data information and updated data information to generate the candidate to-be-written data information. Alternatively, the controller 106 replaces data content at a same location in the error-corrected data information with the updated data content based on the updated data location to generate the candidate to-be-written data information.

Step 210: The controller 106 determines, based on the stored data information and the candidate to-be-written data information, a bit or byte that actually needs to be updated.

The determining a bit or byte that actually needs to be updated may be: the controller 106 performs a mask operation on the candidate to-be-written data information based on the stored data information, where unmasked content in the candidate to-be-written data information is the bit or byte that actually needs to be updated. Alternatively, the determining a bit or byte that actually needs to be updated may be: the controller 106 compares the stored data information and the candidate to-be-written data information, where a bit or byte that is in the candidate to-be-written data information and whose value is different from that in the stored data information is the bit or byte that actually needs to be updated.

Step 212: The controller 106 writes the determined bit or byte that actually needs to be updated and that is in the candidate to-be-written data information into the memory.

In the method embodiment corresponding to FIG. 2, the controller 106 performs error correction on the stored data information to generate the error-corrected data information, generates the candidate to-be-written data information based on the error-corrected data information and the data update indication, determines the bit or byte that actually needs to be updated and that is in the candidate to-be-written data information based on the stored data information, and writes content of the determined bit or byte into the memory. In this embodiment of the present disclosure, a minimum write operation is performed on the data information that needs to be updated. In a scenario in which only several bits in the stored data information need to be updated or even 1 bit in the stored data information needs to be updated, content of not all bits in the stored data information needs to be updated, thereby reducing power consumption and a latency of a single write operation. In addition, in the present disclosure, error correction is performed on the stored information before information writing, such that updated content is based on error-corrected content, thereby ensuring accuracy of the updated content.

FIG. 3 shows a form of a codeword (code-word) stored in a memory 108 according to an embodiment of the present disclosure. The codeword includes data information and ECC check information of the data information. Data information codeword and ECC check information corresponding to the data information of a same codeword are stored in a same memory 108. For example, the data information and the ECC check information corresponding to the data information have a same read/write address, and the controller 106 may obtain the data information and the corresponding ECC check information at one time using the read/write address. The memory 108 in FIG. 1 may be in the form in FIG. 3, and data information 102 and ECC check information 104 of a same codeword are stored in a same memory.

FIG. 4 shows another optional manner of a stored codeword according to an embodiment of the present disclosure. In this optional manner, data information codeword and corresponding ECC check information of the codeword are stored in different memories 108. For example, a memory 108-1 stores the data information of the codeword, and the memory 108-2 stores the ECC check information of the codeword. In other words, the data information and the ECC check information have different read/write addresses. The apparatus 100 stores a mapping table of storage addresses of data information and ECC check information in different memories, or a mapping relationship table of storage addresses (for example, a storage address of data information and a storage address of ECC check information) and codewords in different memories. For example, the mapping table of storage addresses of data information and ECC check information is stored in a hard disk or a Flash in the apparatus 100. The controller 106 separately reads, based on the mapping table, the data information and the ECC check information corresponding to the data information. In the schematic diagram of the apparatus in FIG. 1, a codeword may alternatively be stored in the form in FIG. 4. That is, data information and the ECC check information of a same codeword are stored in different memories 108.

Figure 5:
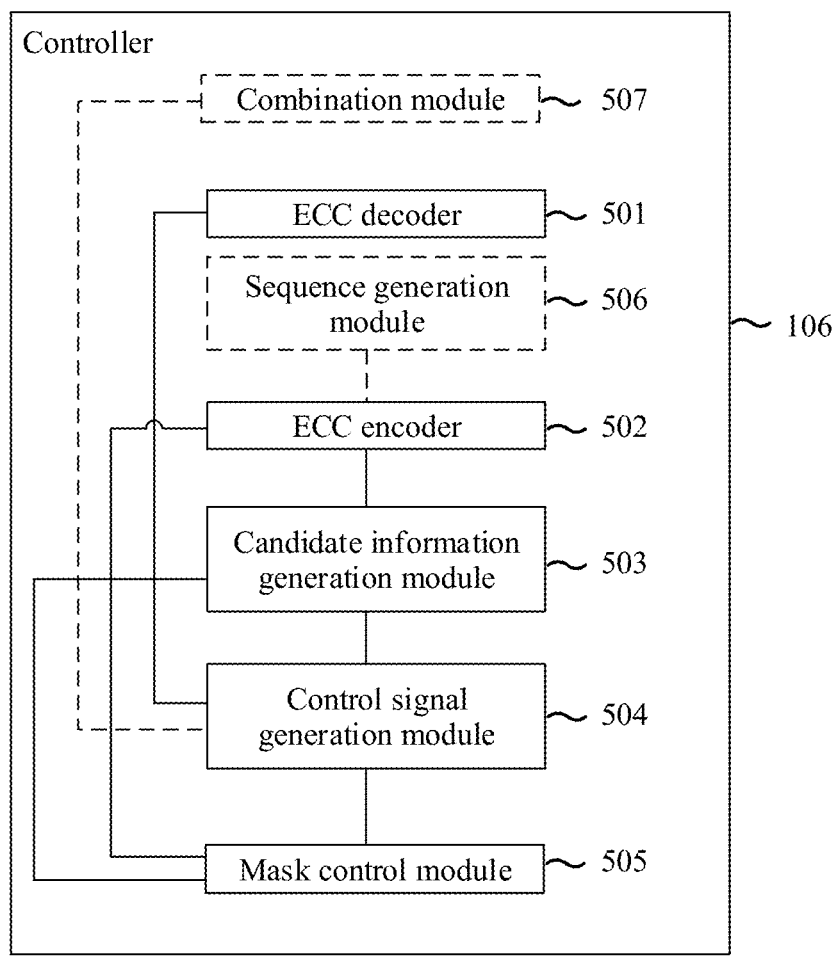
FIG. 5 is a schematic structural diagram of a controller according to an embodiment of this application.

FIG. 5 is a schematic structural diagram of a controller according to an embodiment of the present disclosure. As shown in FIG. 5, a controller 106 includes an ECC decoder 501, an ECC encoder 502, a candidate information generation module 503, a control signal generation module 504, a mask control module 505, a sequence generation module 506, and a combination module 507. The controller 106 may be the controller in FIG. 1.

The ECC decoder 501 is configured to perform ECC decoding on stored data information based on the stored data information and stored ECC check information to generate an error-corrected codeword, where the error-corrected codeword includes error-corrected data information.

The candidate information generation module 503 is configured to generate candidate to-be-written data information based on the error-corrected data information and a data update indication.

The mask control module 505 performs a mask operation on the candidate to-be-written data information based on the stored data information, such that unmasked content in the candidate to-be-written data information is written into a memory.

Further, the modules of the controller 106 may perform steps performed by corresponding modules of a controller 106 in method procedures in FIG. 6A, FIG. 7A, and FIG. 8 to FIG. 11, and FIG. 2 described above.

Figure 6A:
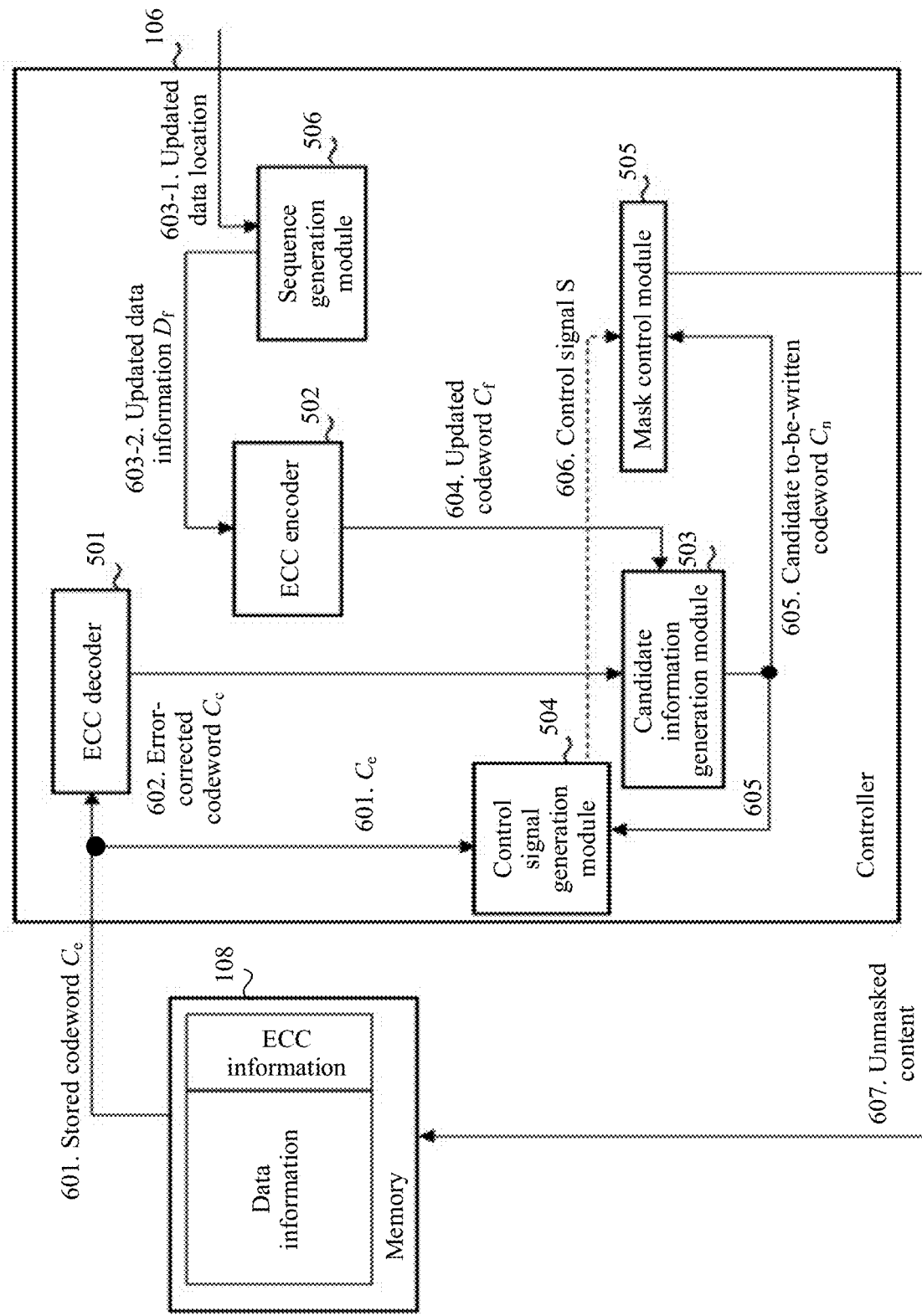
FIG. 6A is a schematic flowchart of a method for updating stored information according to an embodiment of this application.

FIG. 6A is a schematic flowchart of a method for updating stored information according to an embodiment of the present disclosure. A controller that performs the method may be the controller 106 in FIG. 4 or FIG. 5. That is, the controller 106 that performs the method in FIG. 6A includes an ECC decoder 501, an ECC encoder 502, a candidate information generation module 503, a control signal generation module 504, a mask control module 505, and a sequence generation module 506. In the method, a codeword is stored in the manner shown in FIG. 3. That is, data information and ECC check information of the codeword are stored in a same memory 108.

In the embodiment provided in FIG. 6A, the controller 106 generates an updated codeword $C_f$ based on a data update indication, and generates a candidate to-be-written codeword $C_n$ based on an error-corrected codeword $C_c$ and the updated codeword $C_f$. Then, the controller 106 performs a mask operation on the candidate to-be-written codeword $C_n$ based on a stored codeword $C_e$, and writes unmasked content in the candidate to-be-written codeword $C_n$ into a memory 108. The method includes the following steps.

Step 601: The ECC decoder 501 and the control signal generation module 504 obtain a codeword $C_e$ stored in the memory 108. The codeword stored in the memory 108 is referred to as the stored codeword $C_e$.

The stored codeword $C_e$ includes stored data information $D_e$ and ECC check information $P_e$ corresponding to the data information. In other words, $C_e=[D_e\ P_e]$.

It should be noted that "obtain" in this embodiment of the present disclosure may be "read", "actively obtain", or "receive".

For example, it is assumed that a length of the stored codeword $C_e$ is n bits, a length of the stored data information $D_e$ is k bits, and a length of the stored ECC check information $P_e$ is p bits. In other words, n=k+p.

Figure 6B:
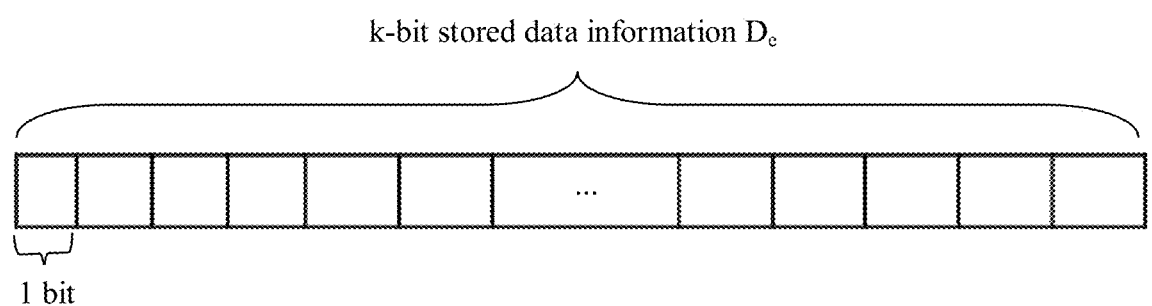
FIG. 6B is a schematic diagram of stored data information $D_e$ according to an embodiment of this application.

For the stored data information $D_e$, refer to FIG. 6B. In FIG. 6B, the stored data information $D_e$ includes k bits, and each grid represents 1 bit. 1 byte includes 8 consecutive bits.

Step 602: The candidate information generation module 503 obtains the error-corrected codeword $C_e$ generated by the ECC decoder 501.

After obtaining the stored codeword $C_e$, the ECC decoder 501 performs ECC decoding on the stored codeword $C_e$ to generate the error-corrected codeword $C_c$. The error-corrected codeword $C_c$ includes error-corrected data information $D_e$ and error-corrected ECC check information $P_c$. The error-corrected ECC check information is ECC check information corresponding to the error-corrected data information.

Step 603-1: The sequence generation module 506 obtains the data update indication, and generates, based on the data update indication, data information that needs to be updated. The data update indication is used to indicate a data location that needs to be updated and that is in the stored codeword $C_e$.

Figure 6C:
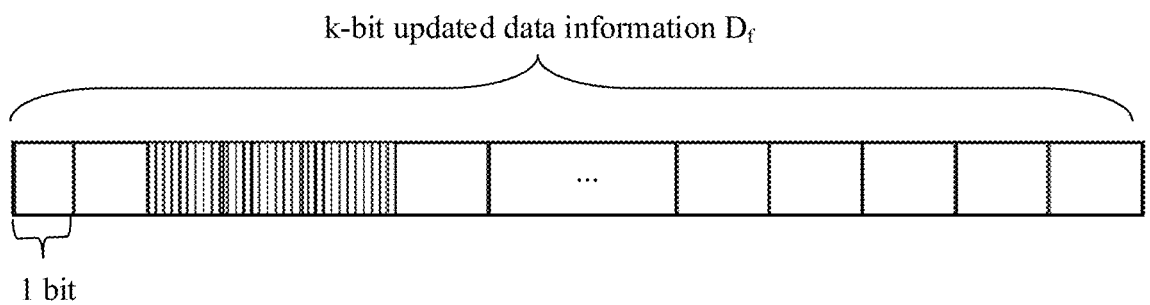
FIG. 6C is a schematic diagram of updated data information $D_f$ according to an embodiment of this application.

When data of the stored codeword $C_e$ in the memory 108 needs to be updated, values of only some bits (for example, 1 or several bits) in the stored codeword $C_e$ may need to be updated. The sequence generation module 506 obtains the data update indication, and generates updated data information $D_f$ based on the updated data location. The updated data information $D_f$ is a bit sequence with a same length as the stored data information $D_e$. In other words, the updated data information $D_f$ is a bit sequence whose length is equal to k. A bit whose value is 1 in $D_f$ indicates a data location that needs to be updated, for example, the first bit or the third bit in the stored data information $D_e$. As shown in FIG. 6C, if values of the third to the fifth bits of the stored data information $D_e$ need to be updated and the other bits do not need to be updated, in the updated data information $D_f$, the sequence generation module 506 sets, to 1, a bit that needs to be updated, and sets, to 0, a bit that does not need to be updated. The updated data information $D_f$ is [0, 0, 1, 1, 1, 0, . . . , 0].

It should be noted that there is no time sequence between steps 601 and 603-1.

Step 603-2: The ECC encoder 502 obtains the updated data information $D_f$. The updated data information $D_f$ is a bit sequence whose length is equal to k. A bit whose value is 1 in the updated data information $D_f$ is a bit that needs to be updated and that is in the stored codeword $C_e$.

It should be noted that there is no time sequence between steps 601 and 603-2.

Step 604: The candidate information generation module 503 obtains the updated codeword $C_f$ generated by the ECC encoder 502.

After obtaining the updated data information $D_f$, the ECC encoder 502 performs ECC encoding on the updated data information $D_f$ to generate the updated codeword $C_f$. The updated codeword $C_f$ includes the updated data information $D_f$ and updated ECC check information $P_f$. The updated ECC check information $P_f$ is ECC check information $P_f$ corresponding to the updated data information $D_f$.

It should be noted that there is no time sequence between steps 602 and 604.

Step 605: The mask control module 505 and the control signal generation module 504 obtain the candidate to-be-written codeword $C_n$ generated by the candidate information generation module 503.

After the ECC decoder 501 generates the error-corrected codeword $C_c$ and the ECC encoder 502 generates the updated codeword $C_f$, the candidate information generation module 503 generates the candidate to-be-written codeword $C_n$ based on the error-corrected codeword $C_c$ and the updated codeword $C_f$. Partial content of the candidate to-be-written codeword $C_n$ is written into the memory 108. The candidate to-be-written codeword $C_n$ includes candidate to-be-written data information $D_n$ and candidate to-be-written ECC check information $P_n$.

For example, the candidate information generation module 503 may perform exclusive OR processing on the error-corrected codeword $C_c$ and the updated codeword $C_f$ to generate the candidate to-be-written codeword $C_n$. In other words, $C_n = C_f \hat{} C_e$. Exclusive OR is a logical operation for performing bitwise comparison on data sequences of a and b when performing exclusive OR processing on a and b (for example, a^b). If values of the two pieces of data a and b in a same bit are different, an exclusive OR result is 1. If values of a and b in a same bit are the same, an exclusive OR result is 0. For example, a=[0011110101], b=[0000111000], and a^b=[0011001101]. Therefore, when $C_f \hat{} C_c$, if values of $C_f$ and $C_c$ in a same bit are the same, a value of $C_n$ in a corresponding bit is 0; or if values of $C_f$ and $C_c$ in a same bit are different, a value of $C_n$ in a corresponding bit is 1.

Step 606: The mask control module 505 obtains a mask control signal S generated by the control signal generation module 504.

After obtaining the candidate to-be-written codeword $C_n$ generated by the candidate information generation module 503, the control signal generation module 504 generates the mask control signal S for the candidate to-be-written codeword $C_n$ based on the candidate to-be-written codeword $C_n$ and the stored codeword $C_e$.

For example, the control signal generation module 504 performs exclusive OR processing on the candidate to-be-written codeword $C_n$ and the stored codeword $C_e$ in step 601 to generate the mask control signal S. In other words, $S = C_n \hat{} C_e$. The mask control signal is referred to as a control signal. The mask control signal S may be used to perform the mask operation on the candidate to-be-written codeword $C_n$. The mask operation is masking a current input bit by performing a bitwise operation on a string of binary numbers with target numbers (namely, the candidate to-be-written codeword $C_n$). Further, the mask control signal S for the candidate to-be-written codeword $C_n$ includes a mask control signal S1 for the candidate to-be-written data information $D_n$ and a mask control signal S2 for the candidate to-be-written ECC check information $P_n$.

The mask control signal S for the candidate to-be-written codeword $C_n$ is a bit sequence whose length is equal to n, and is used to indicate to perform the mask operation on the candidate to-be-written codeword $C_n$ with the same length. When performing processing (for example, exclusive OR processing) on the candidate to-be-written codeword $C_n$ and the stored codeword $C_e$, the control signal generation module 504 compares the candidate to-be-written codeword $C_n$ and the stored codeword $C_e$. If a value of $C_n$ is the same as a value of $C_e$ at a same location, content at a corresponding location in the control signal S is 0. If a value of $C_n$ is different from a value of $C_e$ at a same location, content at a corresponding location in the control signal S is 1.

Figure 6D:
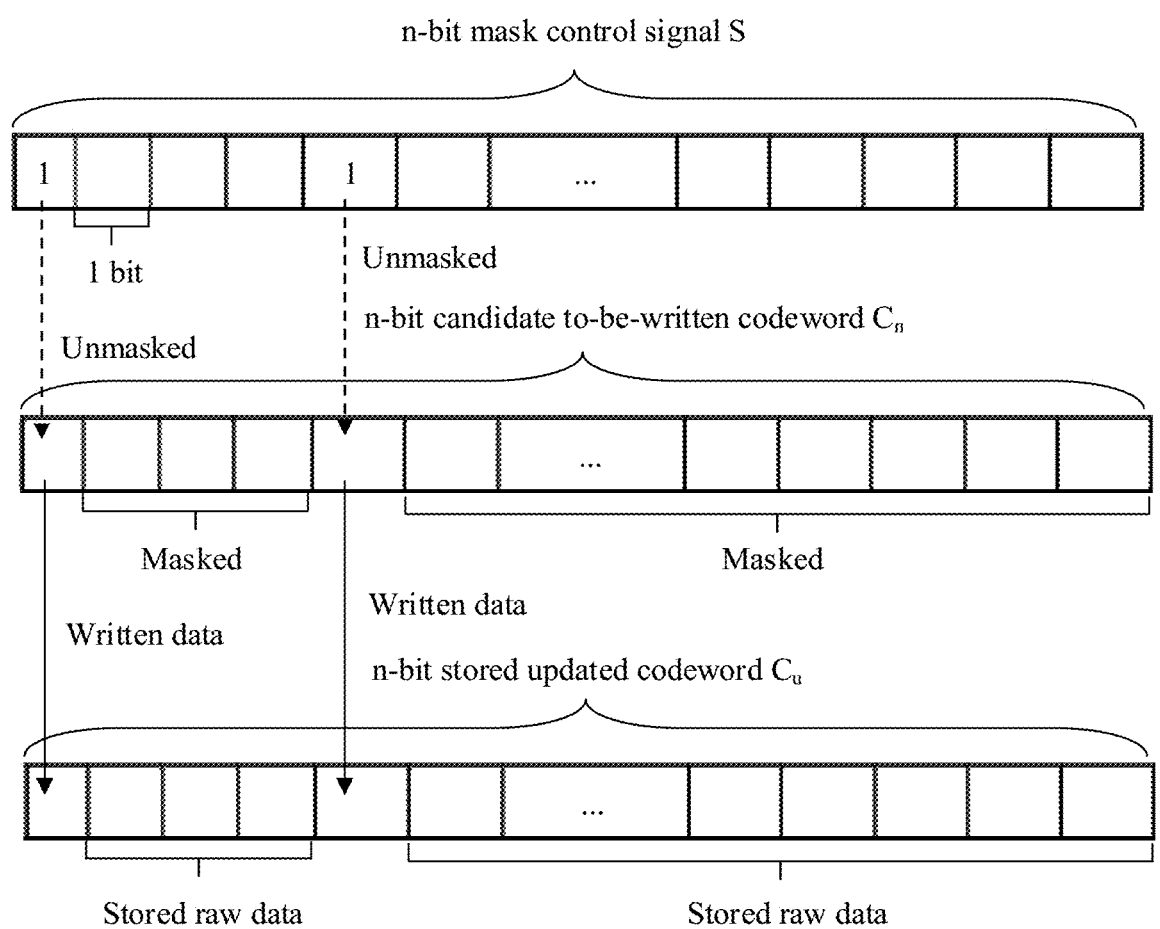
FIG. 6D is a schematic diagram of performing a mask operation based on a mask control signal and writing data according to an embodiment of this application.

Referring to FIG. 6D, a length of the candidate to-be-written codeword Cn is n bits, and the candidate to-be-written codeword Cn includes k-bit data information and p-bit ECC check information. A length of the mask control signal S in FIG. 6D is also n bits. In the mask control signal S shown in FIG. 6D, a bit whose content is 1 indicates not to perform the mask operation on a corresponding bit in the candidate to-be-written codeword. A bit whose content is 0 (not shown in the figure) indicates to perform the mask operation on a corresponding bit in the candidate to-be-written codeword. The mask control module 505 performs the mask operation on the bits other than the first bit and the fifth bit in the candidate to-be-written codeword Cn based on the mask control signal S shown in FIG. 6D.

Step 607: The mask control module 505 performs the mask operation on the candidate to-be-written codeword $C_n$, such that the unmasked content in the candidate to-be-written codeword $C_n$ is written into the memory 108.

The unmasked content includes unmasked data content and/or unmasked ECC check content in the candidate to-be-written codeword $C_n$. After obtaining the mask control signal S generated by the control signal generation module 504, the mask control module 505 performs the mask operation on the candidate to-be-written codeword $C_n$ based on the mask control signal S. A mask (mask) technology can mask a specified bit (for example, a bit or byte) to achieve a bitwise (for example, a bit or byte) operation. The mask operation is masking a current input bit by performing a bitwise operation on a string of binary numbers with target numbers.

The mask control module 505 performs the mask operation on the candidate to-be-written codeword $C_n$ based on the mask control signal S in FIG. 6D. If content at a corresponding location (for example, bit) in the mask control signal S is 0, the mask operation is performed on a corresponding location in the candidate to-be-written codeword $C_n$. In other words, content at the corresponding location in the candidate to-be-written codeword $C_n$ is masked, and does not need to be written into the storage module. If content at a location in the mask control signal S is 1, content at a corresponding location in the candidate to-be-written codeword $C_n$ is not masked, and needs to be written into the memory 108. Still using FIG. 6D as an example, values of the first bit and the fifth bit in the control signal S are 1, and values of the other bits are 0 (not shown in the figure). Content of the bits other than the first bit and the fifth bit in the candidate to-be-written codeword $C_n$ is masked, and does not need to be stored at corresponding locations in the stored codeword $C_e$. Only content of the first bit and the fifth bit needs to be written into the memory.

Still using FIG. 6D as an example, data content of the first bit and the fifth bit in the n-bit updated codeword $C_u$ is written updated data content. Information at the other locations in the updated codeword $C_u$ is still information at corresponding locations in the stored codeword $C_e$. Therefore, according to the method, when stored data is partially updated, only a small quantity of updated bits (for example, the first bit and the fifth bit) need to be written, thereby reducing writing time and power consumption.

Figure 6E:
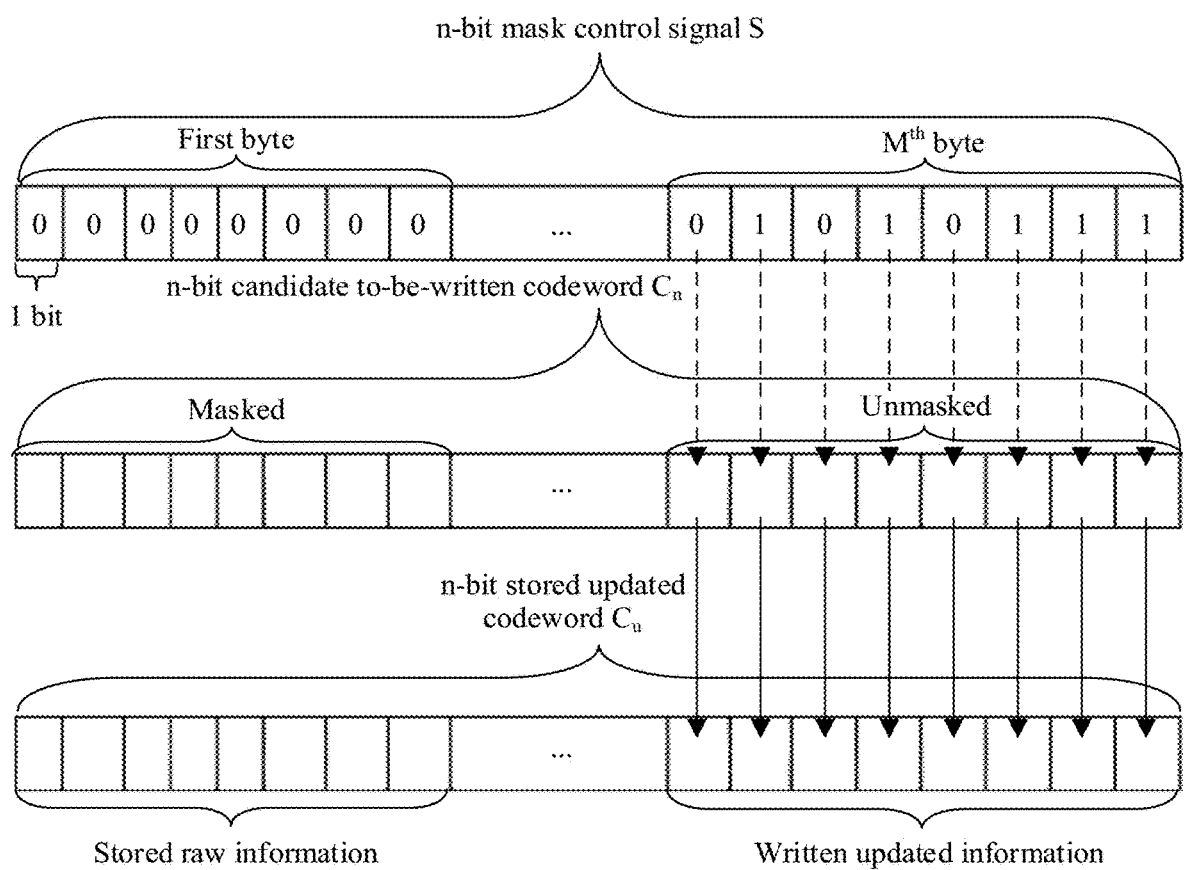
FIG. 6E is another schematic diagram of performing a mask operation based on a mask control signal and writing data according to an embodiment of this application.

In another optional manner, the mask control module 505 may perform a mask operation in 1 byte. After receiving the control signal S generated by the control signal generation module 504, after determining that values of all bits of a corresponding byte in the control signal S are 0, the mask control module 505 performs a mask operation on the byte. As shown in FIG. 6E, the n-bit mask control signal S includes mask control signals for m bytes. Values of all bits in the first byte are 0. In the $m^{th}$ byte, the second, fourth, sixth, seventh, and eighth bits are 1, and the other bits are 0. Because a value of at least 1 bit in the $m^{th}$ byte is not 0, the mask control module 505 does not perform the mask operation on the $m^{th}$ byte, and content of the $m^{th}$ byte needs to be written into the memory 108. Therefore, in an n-bit updated codeword $C_u$, content of the $m^{th}$ byte is written updated data content.

In addition, to improve mask efficiency, the mask control module 505 may alternatively perform a mask operation in a plurality of bytes. For example, the mask control module 505 performs the mask operation on content at corresponding locations in the candidate to-be-written codeword only when values of all bits of two or more adjacent bytes are 0.

That is, the performing the mask operation on the candidate to-be-written codeword $C_n$ based on the control signal S may be: the mask control module 505 masks a bit whose value is 0 in the control signal S in the candidate to-be-written codeword $C_n$; masks a byte whose bit values are all 0 in the control signal S in the candidate to-be-written codeword $C_n$; or masks a plurality of adjacent bytes in the candidate to-be-written codeword $C_n$, where the control signal S indicates that bit values of the plurality of adjacent bytes are all 0.

According to the method provided in this embodiment of the present disclosure, the updated codeword is generated based on the updated data location, and the controller 106 generates the candidate to-be-written codeword based on the error-corrected codeword generated after error correction is performed on the stored codeword and based on the updated codeword. The controller 106 performs the mask operation on the candidate to-be-written codeword, and writes the unmasked content in the candidate to-be-written codeword into the memory. The present disclosure provides a minimum write operation for a bit sequence that needs to be updated and corresponding ECC information. In a scenario in which only some bits in a stored byte need to be updated or even 1 bit in a stored byte needs to be updated, not all bits of the byte need to be updated, thereby reducing power consumption and a latency of a single write operation. In addition, in the present disclosure, error correction is performed on the stored information before update, such that updated content is based on error-corrected content, thereby ensuring accuracy of the updated content.

Figure 7A:
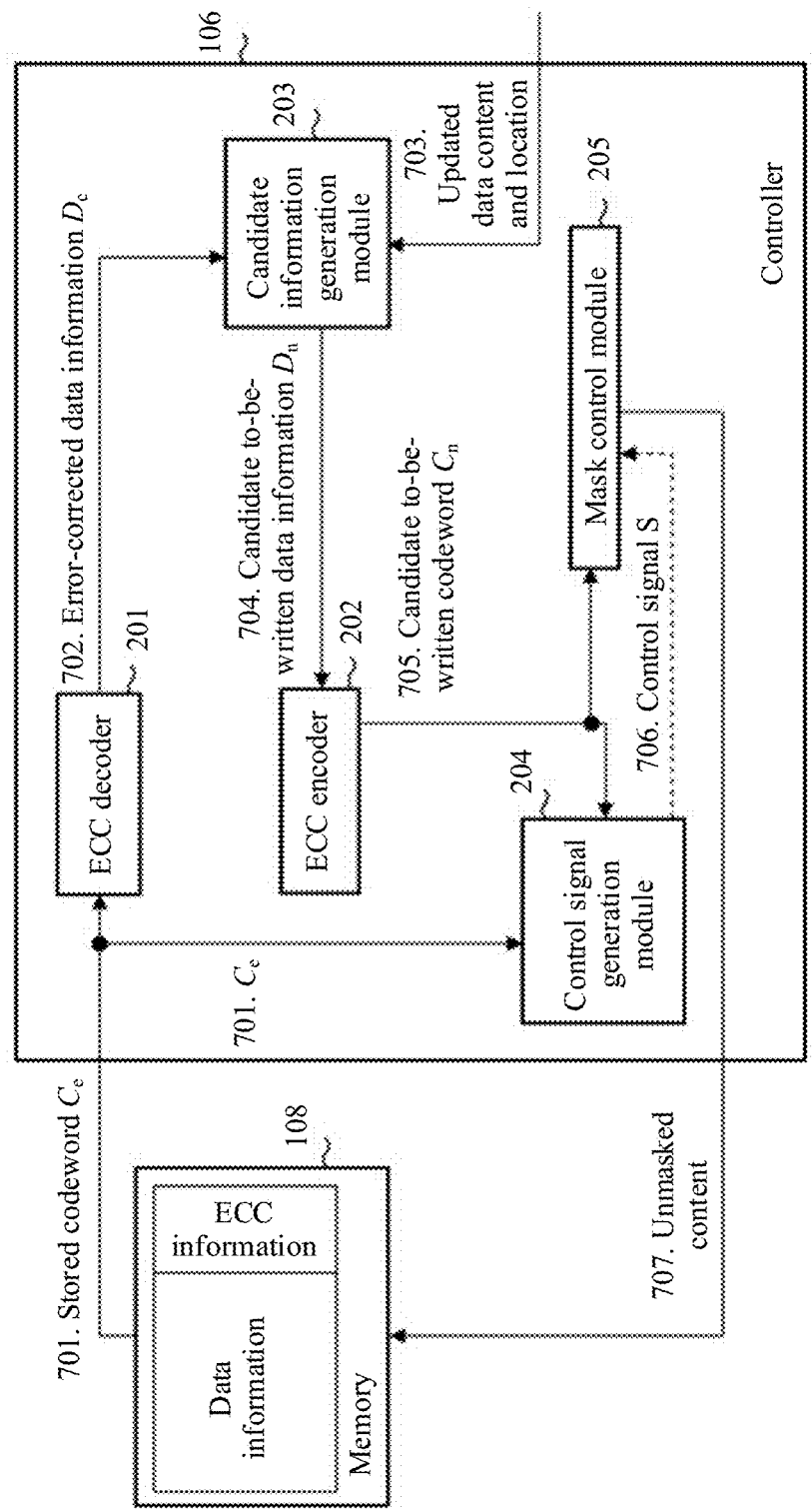
FIG. 7A is another schematic flowchart of a method for updating stored information according to an embodiment of this application.

FIG. 7A is a schematic flowchart of a method for updating stored information according to an embodiment of the present disclosure. A controller that performs the method may be the controller 106 in FIG. 5. That is, the controller 106 includes an ECC decoder 501, an ECC encoder 502, a candidate information generation module 503, a control signal generation module 504, and a mask control module 505. In the method, a codeword is stored in the manner shown in FIG. 3. That is, data information and ECC check information of the codeword are stored in a same memory 108.

In FIG. 6A, the controller 106 receives the updated data location, generates the updated data information based on the updated data location, and performs ECC encoding on the updated data information to generate the codeword that needs to be updated, and then generates the candidate to-be-written codeword $C_n$ based on the error-corrected codeword and the codeword that needs to be updated. In the embodiment provided in FIG. 7A, the controller 106 receives an updated data location and updated data content, and generates candidate to-be-written data information $D_n$ based on error-corrected data information $D_c$ and the updated data content and the data location. The ECC encoder 502 performs ECC encoding on the candidate to-be-written data information $D_n$ to generate a candidate to-be-written codeword $C_n$. The method provided in FIG. 7A includes the following steps.

Step 701: The ECC decoder 501 and the control signal generation module 504 obtain a codeword $C_e$ stored in a memory 108. The stored codeword $C_e$ includes stored data information $D_e$ and ECC check information $P_e$ corresponding to the data information. In other words, $C_e = [D_e P_e]$.

For example, it is assumed that a length of the stored codeword $C_e$ is n bits, a length of the stored data information $D_e$ is k bits, and a length of the stored ECC check information $P_e$ is n-k bits.

For the stored data information obtained by the ECC decoder 501 and the control signal generation module 504, refer to FIG. 6B. In FIG. 6B, the stored data information $D_e$ includes k bits, and each grid represents 1 bit. 1 byte includes 8 consecutive bits.

Step 702: The candidate information generation module 503 obtains the error-corrected data information $D_c$ generated by the ECC decoder 501.

After obtaining the stored codeword $C_e$, the ECC decoder 501 performs ECC decoding on the stored codeword $C_e$ to generate an error-corrected codeword $C_c$. The error-corrected codeword $C_c$ includes the error-corrected data information $D_c$ and error-corrected ECC check information $P_c$.

Figure 7B:
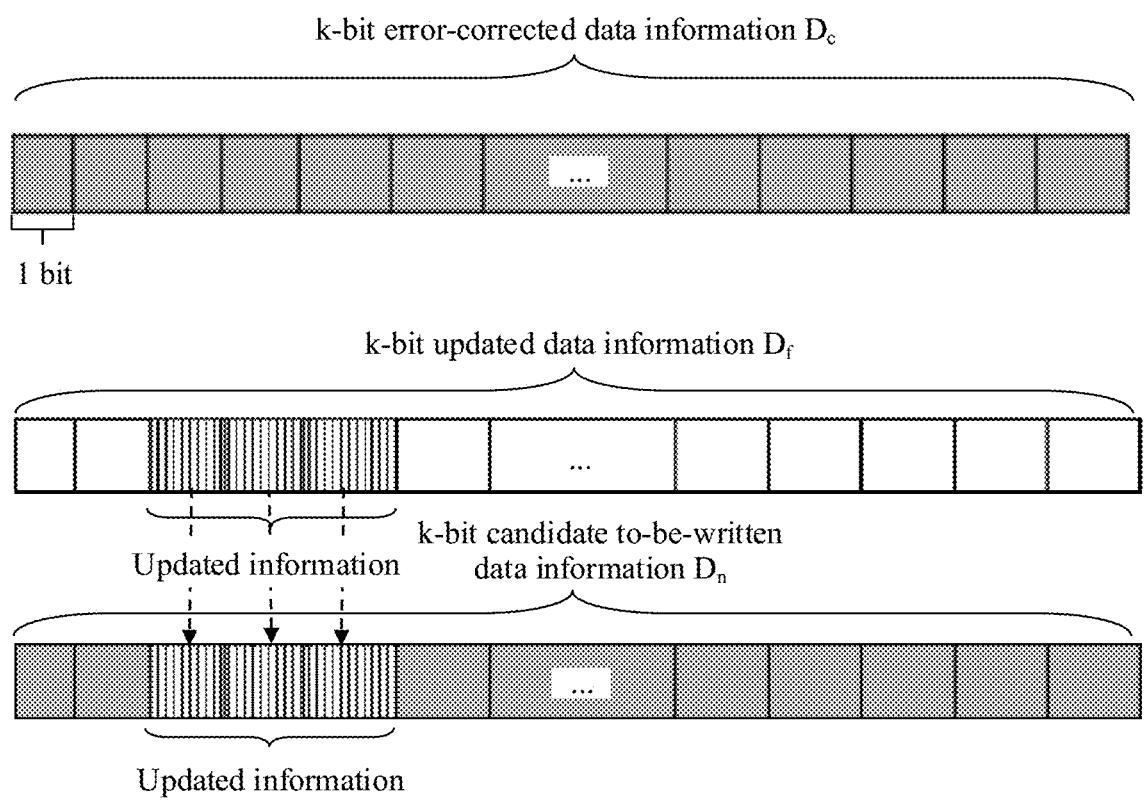
FIG. 7B is a schematic diagram of generating candidate to-be-written data information based on error-corrected data information and updated data information according to an embodiment of this application.

For example, for the error-corrected data information $D_c$, refer to FIG. 7B. In FIG. 7B, one grid represents 1 bit, and the third to the fifth bits are bits that need to be updated.

Step 703: The candidate information generation module 503 obtains a data update indication, and generates the candidate to-be-written data information based on the data update indication. The data update indication is used to indicate the updated data content and the updated data location.

When data content at a corresponding location in the codeword stored in the memory needs to be updated, in some logical calculation operations, only r consecutive bits of the error-corrected data information need to be updated, and other data information is retained, where r is a positive integer greater than or equal to 1.

It should be noted that there is no time sequence between steps 701 and 703.

Step 704: The ECC encoder 502 obtains the candidate to-be-written data information $D_n$ generated by the candidate information generation module 503.

After obtaining the updated data content and the updated data location, the candidate information generation module 503 replaces content at a corresponding location (bit) in the error-corrected data information Dc with the updated data content based on the updated data location.

In another optional manner, the controller 106 may further include a sequence generation module 506, and the sequence generation module 506 obtains the updated data content and generates updated data information $D_f$ based on the updated data content. As shown in FIG. 7B, the updated data information $D_f$ is a k-bit data sequence. In the updated data information $D_f$, content of the third to the fifth bits is the updated data content. After obtaining the error-corrected data information $D_c$ and the updated data information $D_f$, the candidate information generation module 503 replaces content of the third to the fifth bits in the $D_c$ with the content of the third to the fifth bits in $D_f$, and retains data at the other locations in $D_c$, to generate the candidate to-be-written data information $D_n$.

Step 705: The control signal generation module 504 and the mask control module 505 obtain the candidate to-be-written codeword $C_n$ generated by the ECC encoder 502.

The ECC encoder 502 performs ECC encoding on the candidate to-be-written data information $D_n$ to generate the candidate to-be-written codeword $C_n$. The candidate to-be-written codeword $C_n$ includes the candidate to-be-written data information $D_n$ and candidate to-be-written ECC check information $P_n$. The candidate to-be-written ECC check information $P_n$ is generated by the ECC encoder 502 by performing ECC encoding based on the candidate to-be-written data information $D_n$.

Step 706: The mask control module 505 obtains a mask control signal S generated by the control signal generation module 504.

After obtaining the candidate to-be-written codeword $C_n$, the control signal generation module 504 generates the mask control signal S for the candidate to-be-written codeword $C_n$ based on the candidate to-be-written codeword $C_n$ and the stored codeword $C_e$ in step 701. For generating, by the control signal generation module 504, the mask control signal S for the candidate to-be-written codeword $C_n$, refer to the description of step 606 in the embodiment corresponding to FIG. 6A. Details are not described herein again in this embodiment of the present disclosure.

Step 707: The mask control module 505 performs a mask operation on the candidate to-be-written codeword $C_n$, such that unmasked content is written into the memory 108.

The unmasked content includes unmasked data content and/or unmasked ECC check content. After obtaining the mask control signal S generated by the control signal generation module 504, the mask control module 505 performs the mask operation on the candidate to-be-written codeword $C_n$ based on the mask control signal S.

In another optional manner, the mask control module 505 may perform a mask operation in one or more bytes. For the mask operation performed by the mask control module 505 in one or more bytes, refer to the description in the embodiment corresponding to FIG. 6A. Details are not described herein again in this embodiment of the present disclosure.

That is, the performing the mask operation on the candidate to-be-written codeword $C_n$ based on the control signal S may be: the mask control module 505 masks a bit whose value is 0 in the control signal S in the candidate to-be-written codeword $C_n$; masks a byte whose bit values are all 0 in the control signal S in the candidate to-be-written codeword $C_n$; or masks a plurality of adjacent bytes in the candidate to-be-written codeword $C_n$, where the control signal S indicates that bit values of the plurality of adjacent bytes are all 0.

The controller 106 writes the unmasked content in the candidate to-be-written codewords $C_n$ into the memory 108.

According to the method shown in FIG. 7A, when processing updated data, the controller 106 performs ECC error correction on the stored data information $D_e$ to generate the error-corrected data information $D_c$. The controller 106 generates the candidate to-be-written data information $D_n$ based on the updated data content and data location and the error-corrected data information $D_c$, and generates the candidate to-be-written codeword $C_n$ based on the candidate to-be-written data information $D_n$. The controller 106 performs the mask operation on the candidate to-be-written codeword $C_n$, and writes the unmasked content in the candidate to-be-written codeword $C_n$ into the memory 108. The present disclosure provides a minimum write operation for data information that needs to be updated and corresponding ECC information. In a scenario in which data of only some bits in the stored data information $D_e$ needs to be updated or data of even 1 bit in the stored data information $D_e$ needs to be updated, not all bits of the stored data information $D_e$ need to be updated, thereby reducing power consumption and a latency of a single write operation. In addition, in the present disclosure, error correction is performed on the stored information before update, such that updated content is based on error-corrected content, thereby ensuring accuracy of the updated content.

Figure 8:
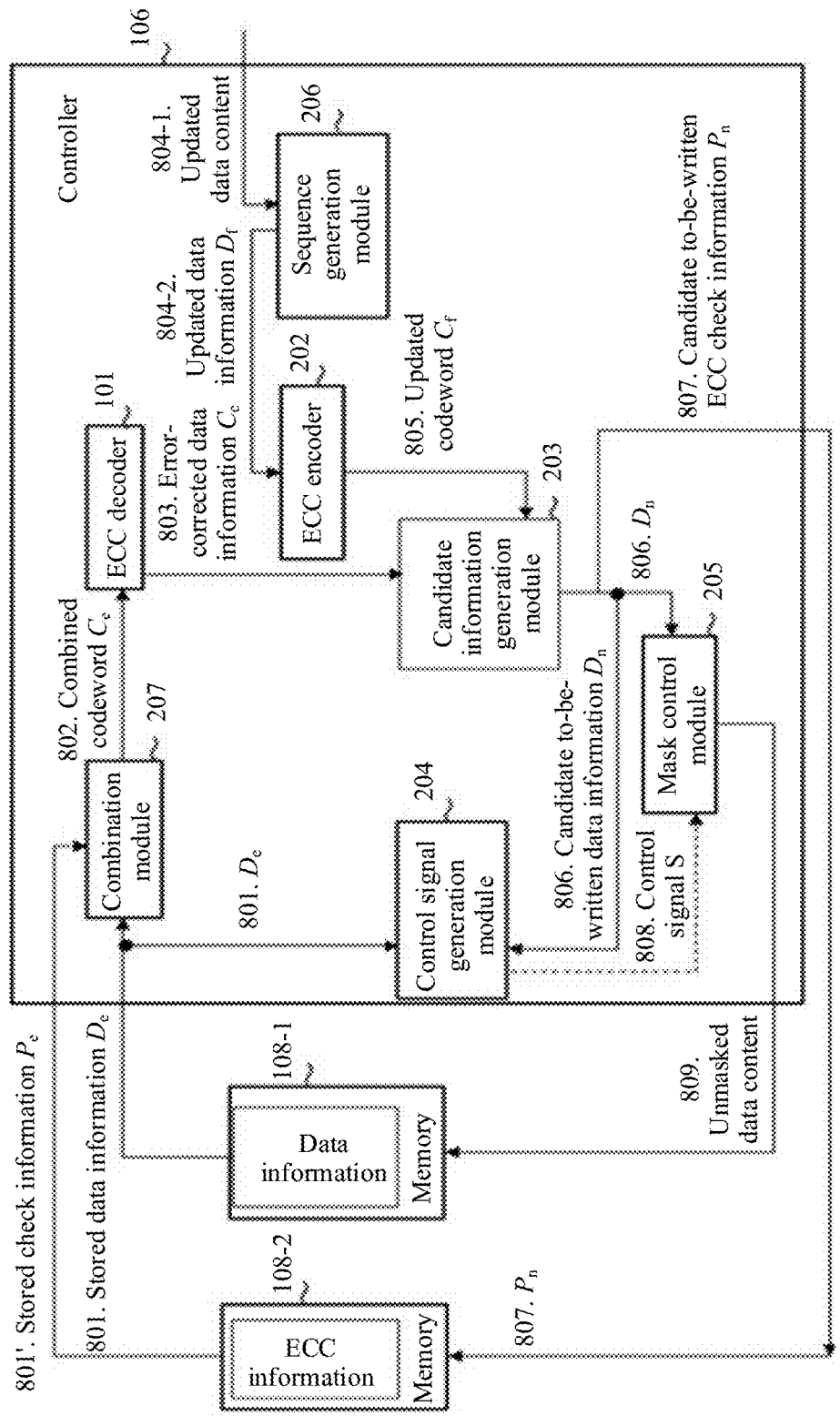
FIG. 8 is another schematic flowchart of a method for updating stored information according to an embodiment of this application.

FIG. 8 is a flowchart of a method for updating stored information according to an embodiment of the present disclosure. A controller that performs the method may be the controller 106 in FIG. 5. That is, the controller 106 includes an ECC decoder 501, an ECC encoder 502, a candidate information generation module 503, a control signal generation module 504, a mask control module 505, a sequence generation module 506, and a combination module 507. In the method, a codeword is stored in the manner shown in FIG. 4. That is, data information and ECC check information of the codeword are stored in different memories 108. In other words, data information and ECC check information of a same codeword have different read/write addresses.

The embodiment provided in FIG. 8 is similar to that in FIG. 6A. That is, the controller 106 receives updated data content, and generates updated data information based on the updated data content. Compared with the embodiment provided in FIG. 6A, data information $D_e$ and ECC check information $P_e$ in FIG. 8 are separately stored in different memories 108. For example, the data information $D_e$ is stored in a memory 108-1, and the ECC check information $P_e$ is stored in a memory 108-2. Different from the controller 106 in FIG. 6A, the controller 106 in FIG. 8 further includes the combination module 507, which is configured to combine the data information $D_e$ and the ECC check information $P_e$ that are stored in the different memories into a codeword $C_e$. The method provided in FIG. 8 includes the following steps.

Step 801: The combination module 507 obtains the data information $D_e$ stored in the memory 108-1.

In addition, the control signal generation module 504 also obtains the data information $D_e$ stored in the memory 108-1.

Step 801': The combination module 507 obtains the ECC check information $P_e$ that corresponds to the data information $D_e$ and that is stored in the memory 108-2. The ECC check information $P_e$ corresponding to the stored data information $D_e$ is referred to as stored ECC check information $P_e$.

In this embodiment, the memory 108-1 and the memory 108-2 store data information $D_e$ and check information $P_e$ of a same codeword (for example, $C_e$) through mapping.

It should be noted that there is no execution sequence between steps 801 and 801'.

Step 802: The ECC decoder 501 obtains the combined codeword $C_e$ generated by the combination module 507.

After obtaining the stored data information $D_e$ and the stored ECC check information $P_e$, the combination module 507 combines the stored data information $D_e$ and the stored ECC check information $P_e$ to generate the combined codeword $C_e$. In other words, $C_e = [D_e\ P_e]$.

The combination module 507 may combine the stored data information $D_e$ and the stored ECC check information $P_e$ in an existing combination manner. Details are not described herein again in this embodiment of the present disclosure.

Step 803: The candidate information generation module 503 obtains an error-corrected codeword $C_c$ generated by the ECC decoder 501.

After obtaining the combined codeword $C_e$, the ECC decoder 501 decodes the combined codeword $C_e$ to generate the error-corrected codeword $C_c$. The error-corrected codeword $C_c$ includes error-corrected data information $D_c$ and error-corrected ECC check information $P_c$.

Steps 804-1 and 804-2 are similar steps 603-1 and 603-2. Details are not described herein again in this embodiment of the present disclosure.

Step 805: The candidate information generation module 503 obtains an updated codeword $C_f$ generated by the ECC encoder 502.

After obtaining the updated data information $D_f$, the ECC encoder 502 performs ECC encoding on the updated data information $D_f$ to generate the updated codeword $C_f$. The updated codeword $C_f$ includes the updated data information $D_f$ and updated ECC check information $P_f$. The updated ECC check information $P_f$ is ECC check information $P_f$ corresponding to the updated data information $D_f$.

Step 806: The mask control module 505 and the control signal generation module 504 obtain candidate to-be-written data information $D_n$ generated by the candidate information generation module 503.

After obtaining the error-corrected codeword $C_c$ and the updated codeword $C_f$, the candidate information generation module 503 generates a candidate to-be-written codeword $C_n$ based on the error-corrected codeword $C_c$ and the updated codeword $C_f$. Partial content of the candidate to-be-written codeword $C_n$ is written into the memory 108. The candidate to-be-written codeword $C_n$ includes the candidate to-be-written data information $D_n$ and candidate to-be-written ECC check information $P_n$.

For example, the candidate information generation module 503 may perform, in an exclusive OR manner, an exclusive OR operation on the error-corrected codeword $C_c$ and the updated codeword $C_f$ to generate the candidate to-be-written codeword $C_n$. In other words, $C_n = C_f \hat{}\ C_c$.

Step 807: The controller writes the candidate to-be-written ECC check information $P_n$ into the memory 108-2.

After the candidate information generation module 503 generates the candidate to-be-written codeword $C_n$, the mask control module 505 obtains the candidate to-be-written data information $D_n$. The candidate to-be-written ECC check information $P_n$ is written into the memory 108-2.

Step 808: The mask control module 505 obtains a mask control signal S generated by the control signal generation module 504.

After obtaining the candidate to-be-written codeword $C_n$ generated by the candidate information generation module 503, the control signal generation module 504 generates the mask control signal based on the candidate to-be-written codeword $C_n$ and the combined codeword $C_e$ in step 802.

For example, the control signal generation module 504 performs exclusive OR processing on the candidate to-be-written data information $D_n$ included in the candidate to-be-written codeword $C_n$ and the stored data information $D_e$ obtained in step 801, to generate the mask control signal S. That is, $S = D_n \hat{}\ D_e$. The mask control signal S includes a mask control signal S1 for the candidate to-be-written data information $D_n$.

For a method for performing, by the control signal generation module 504, exclusive OR processing on the candidate to-be-written data information $D_n$ and the stored data information $D_e$, refer to the description of step 606. Details are not described again in this embodiment of the present disclosure.

Step 809: The mask control module 505 performs a mask operation on the candidate to-be-written data information $D_n$, such that unmasked content in the candidate to-be-written data information $D_n$ is written into the memory 108-1.

The unmasked content is unmasked data content, namely, a value of an unmasked bit. After obtaining the mask control signal S generated by the control signal generation module 504, the mask control module 505 performs the mask operation on the candidate to-be-written data information $D_n$ based on the mask control signal S.

That is, the performing the mask operation on the candidate to-be-written data information $D_n$ based on the control signal S may be: the mask control module 505 masks a bit whose value is 0 in the control signal S in the candidate to-be-written data information $D_n$; or the mask control module 505 masks a byte in the candidate to-be-written data information $D_n$, where the control signal S indicates that bit values of the byte are all 0.

Figure 9:
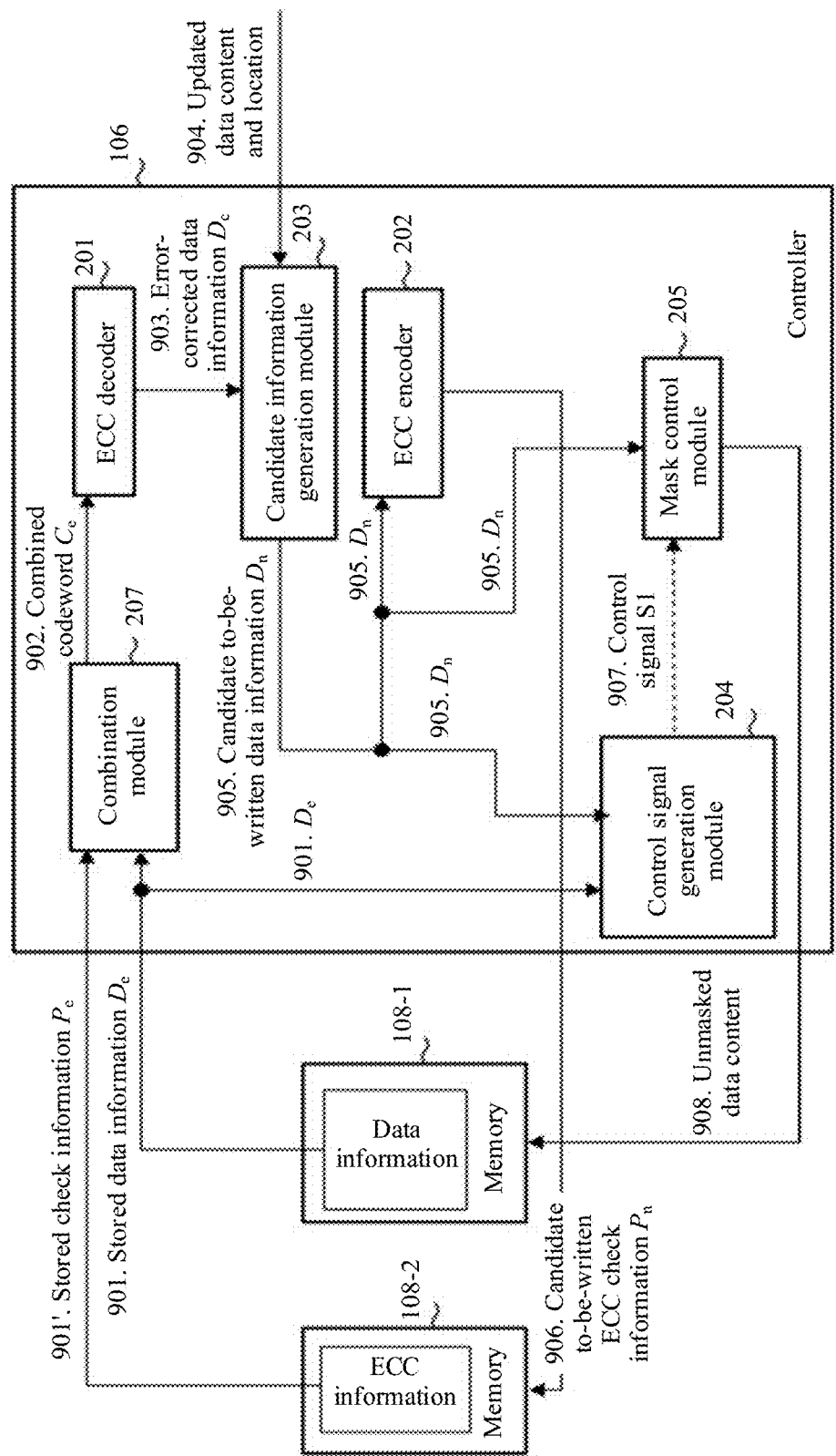
FIG. 9 is another schematic flowchart of a method for updating stored information according to an embodiment of this application.

FIG. 9 is a flowchart of a method for updating stored information according to an embodiment of the present disclosure. A controller that performs the method may be the controller 106 in FIG. 5. That is, the controller 106 includes an ECC decoder 501, an ECC encoder 502, a candidate information generation module 503, a control signal generation module 504, a mask control module 505, and a combination module 507. In the method, a codeword is stored in the manner shown in FIG. 4. That is, data information and ECC check information of the codeword are stored in different memories.

A procedure of the embodiment provided in FIG. 9 is similar to that in FIG. 7A. The controller 106 receives updated data content and data location, and the candidate information generation module 203 generates candidate to-be-written data information based on the updated data content and data location and error-corrected data information. Compared with the embodiment provided in FIG. 7A, data information and ECC check information in FIG. 9 are separately stored in different memories. For example, the data information is stored in a memory 108-1, and the ECC check information is stored in a memory 108-2. Therefore, before the decoder 501 performs decoding, the combination module 507 needs to first combine the stored ECC check information and data information to generate a combined codeword. The method provided in FIG. 9 includes the following steps.

Step 901: The combination module 507 obtains the data information $D_e$ stored in the memory 108-1.

In addition, the control signal generation module 504 also obtains the data information $D_e$ stored in the memory 108-1.

Step 901': The combination module 507 obtains the ECC check information $P_e$ that corresponds to the data information and that is stored in the memory 108-2. The ECC check information $P_e$ corresponding to the stored data information is referred to as stored ECC check information $P_e$.

In this embodiment, the memory 108-1 and the memory 108-2 store data information $D_e$ and ECC check information $P_e$ of a same codeword (for example, $C_e$) through mapping.

It should be noted that there is no execution sequence between steps 901 and 901'.

Step 902: The ECC decoder 501 obtains the combined codeword $C_e$ generated by the combination module 507, where the combined codeword $C_e$ is also a stored codeword $C_e$.

After obtaining the stored data information $D_e$ and the stored ECC check information $P_e$, the combination module 507 combines the stored data information $D_e$ and the stored ECC check information $P_e$ to generate the combined codeword $C_e$. In other words, $C_e=[D_e P_e]$.

The combination module 507 may combine the stored data information $D_e$ and the stored ECC check information $P_e$ in an existing combination manner. Details are not described herein again in this embodiment of the present disclosure.

Step 903: The candidate information generation module 503 obtains the error-corrected data information $D_c$ generated by the ECC decoder 501.

After obtaining the stored codeword $C_e$, the ECC decoder 501 performs ECC decoding on the stored codeword $C_e$ to generate an error-corrected codeword $C_c$. The error-corrected codeword $C_c$ includes the error-corrected data information $D_c$ and error-corrected ECC check information $P_c$.

Step 904: The candidate information generation module 503 obtains a data update indication, where the data update indication is used to indicate a data location that needs to be updated and data content that needs to be updated and that is in the stored data information.

For step 904, refer to step 703 of the method corresponding to FIG. 7A. Details are not described herein again in this embodiment of the present disclosure.

It should be noted that there is no time sequence among steps 901 and 901' and step 904.

Step 905: The ECC encoder 502 obtains the candidate to-be-written data information $D_n$ generated by the candidate information generation module 503.

Refer to step 704 of the method corresponding to FIG. 7A. Details are not described herein again in this embodiment of the present disclosure.

In addition, the control signal generation module 504 and the mask control module 505 also obtain the candidate to-be-written data information $D_n$ generated by the candidate information generation module 503.

Step 906: The ECC encoder 502 generates candidate to-be-written ECC check information $P_n$, such that the controller writes the candidate to-be-written ECC check information $P_n$ into the memory 108-2.

The ECC encoder 502 performs ECC encoding on the candidate to-be-written data information $D_n$ to generate a candidate to-be-written codeword $C_n$. The candidate to-be-written codeword $C_n$ includes the candidate to-be-written data information $D_n$ and the candidate to-be-written ECC check information $P_n$. All content of the candidate to-be-written ECC check information $P_n$ is written into the memory 108-2.

Step 907: The mask control module 505 obtains a mask control signal S generated by the control signal generation module 504.

After obtaining the candidate to-be-written data information $D_n$, the control signal generation module 504 generates the mask control signal S based on the candidate to-be-written data information $D_n$ and the stored data information $D_e$. For example, the control signal generation module 504 performs exclusive OR processing on the candidate to-be-written data information $D_n$ and the stored data information $D_e$ to generate the mask control signal S. In other words, $S=D_n \wedge D_e$. The mask control signal S is a mask control signal S1 for the candidate to-be-written data information $D_n$.

For a method for performing, by the control signal generation module 504, exclusive OR processing on the candidate to-be-written data information $D_n$ and the stored data information $D_e$, refer to the description of step 706. Details are not described again in this embodiment of the present disclosure.

Step 908: The mask control module 505 performs a mask operation on the candidate to-be-written data information $D_n$, such that the controller 106 writes unmasked content in the candidate to-be-written data information $D_n$ into the memory 108-1.

For step 908, refer to the description of step 809. Details are not described again in this embodiment of the present disclosure.

In this embodiment of the present disclosure, the controller performs a minimum write operation for data content that needs to be updated and corresponding ECC information. In a scenario in which only some bits in a stored byte need to be updated or even 1 bit in a stored byte needs to be updated, not all bits of the byte need to be updated, thereby reducing power consumption and a latency of a single write operation.

Figure 10:
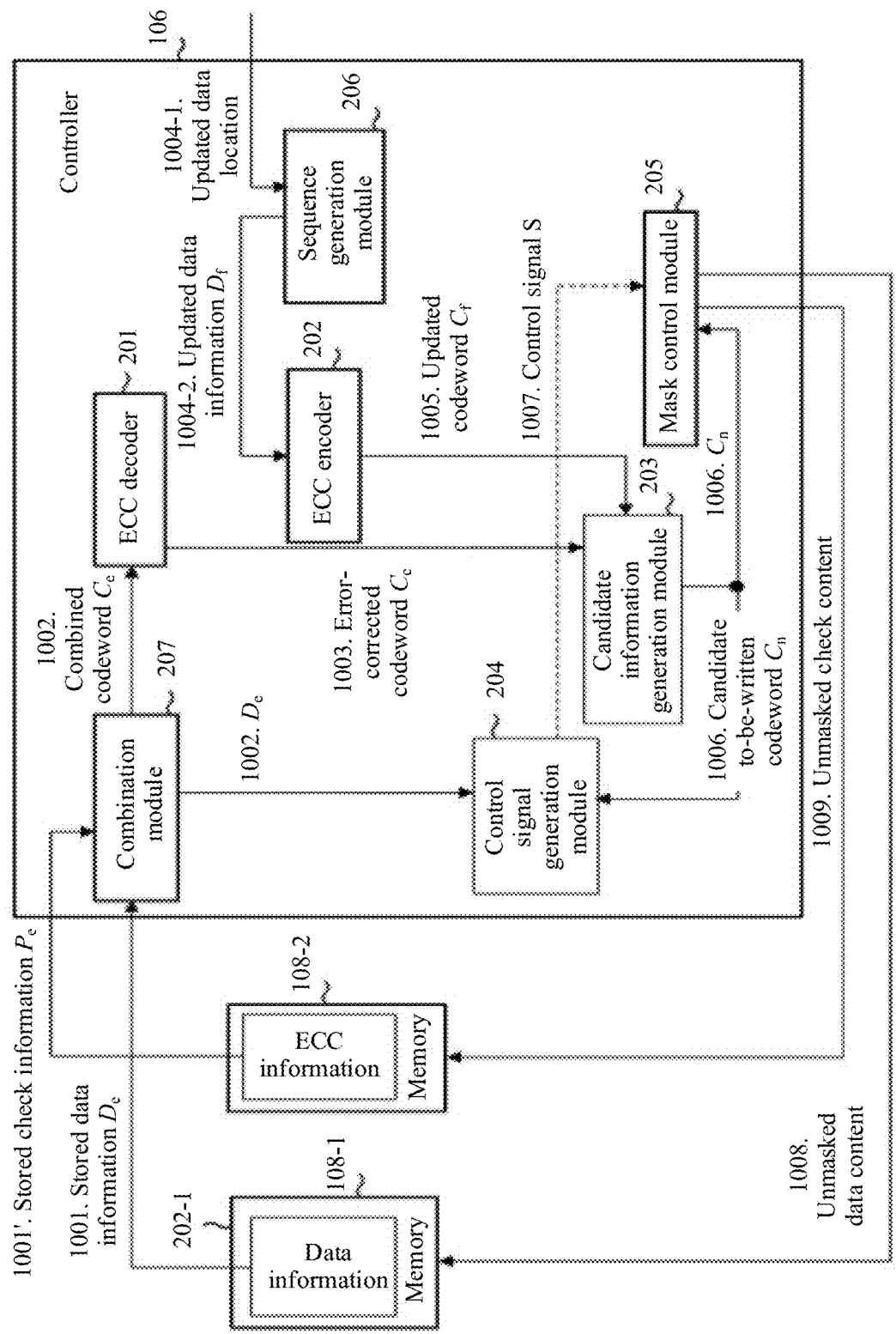
FIG. 10 is another schematic flowchart of a method for updating stored information according to an embodiment of this application.

FIG. 10 is a flowchart of a method for updating stored information according to an embodiment of the present disclosure. A controller that performs the method may be the controller 106 in FIG. 5. That is, the controller 106 includes an ECC decoder 501, an ECC encoder 502, a candidate information generation module 503, a control signal generation module 504, a mask control module 505, a sequence generation module 506, and a combination module 507. In the method, a codeword is stored in the manner shown in FIG. 4. That is, data information and ECC check information of the codeword are stored in different memories.

The embodiment provided in FIG. 10 is similar to the embodiment corresponding to FIG. 6A and the embodiment corresponding to FIG. 8. That is, the controller 106 receives updated data content, and generates updated data information based on the updated data content. Compared with the embodiment in FIG. 6A, ECC check information and data information in the embodiment corresponding to FIG. 10 are stored in different memories. Compared with the embodiment provided in FIG. 8, the controller 106 in the embodiment provided in FIG. 10 performs a mask operation on both candidate to-be-written data information $D_n$ and candidate to-be-written ECC check information $P_n$. The method provided in FIG. 10 includes the following steps.

Steps 1001, 1001', and 1002 are the same as steps 801, 801', and 802. Details are not described again in this embodiment of the present disclosure.

In addition, the control signal generation module 504 further obtains the combined codeword $C_e$ generated by the combination module 507.

Step 1003: The candidate information generation module 503 obtains error-corrected data information $D_c$ generated by the ECC decoder 501.

For a detailed description of step 1003, refer to that of step 602. Details are not described herein again in this embodiment of the present disclosure.

Descriptions of steps 1004-1 and 1004-2 are the same as those of steps 603-1 and 603-2. Details are not described again in this embodiment of the present disclosure.

Step 1005: The candidate information generation module 503 obtains an updated codeword $C_f$ generated by the ECC encoder 502.

The ECC encoder 502 performs ECC encoding on the updated data information $D_f$ to generate the updated codeword $C_f$. The updated codeword $C_f$ includes the updated data information $D_f$ and updated ECC check information $P_f$. The updated ECC check information $P_f$ is ECC check information $P_f$ corresponding to the updated data information $D_f$.

It should be noted that there is no time sequence between steps 1002 and 1005.

Steps 1006 and 1007 are the same as steps 605 and 606. Details are not described herein again in this embodiment of the present disclosure.

The generated mask control signal S in step 1007 includes a mask control signal S1 for the candidate to-be-written data information and a mask control signal S2 for the candidate to-be-written ECC check information.

Step 1008: The mask control module 505 performs the mask operation on the candidate to-be-written data information $D_n$, such that unmasked content in the candidate to-be-written data information $D_n$ is written into the memory 108-1.

A description of step 1008 is the same as that of step 809. Details are not described herein again in this embodiment of the present disclosure.

Step 1009: The mask control module 505 performs the mask operation on the candidate to-be-written ECC check information $P_n$, such that unmasked content in the candidate to-be-written ECC check information $P_n$ is written into the memory 108-2.

After obtaining the mask control signal S sent by the control signal generation module 504, the mask control module 505 performs the mask operation on the candidate to-be-written ECC check information $P_n$ based on the mask control signal S2 that is for the candidate to-be-written ECC check information and that is included in the mask control signal S, such that the unmasked content in the candidate to-be-written ECC check information $P_n$ is written into the memory 108-2.

That is, the performing the mask operation on the candidate to-be-written ECC check information $P_n$ based on the control signal S may be: the mask control module 505 masks a bit in the candidate to-be-written ECC check information $P_n$, where the mask control signal S2 indicates that the bit is 0; or the mask control module 505 masks a byte in the candidate to-be-written ECC check information $P_n$, where the control signal S2 indicates that bit values of the byte are all 0.

According to the method, in a process of processing updated data, after performing ECC error correction on stored data, the controller 106 combines error-corrected data with the updated data information $D_f$, and then performs masking and writing. This reduces an amount of written data, thereby reducing time and power consumption of a write operation.

Figure 11:
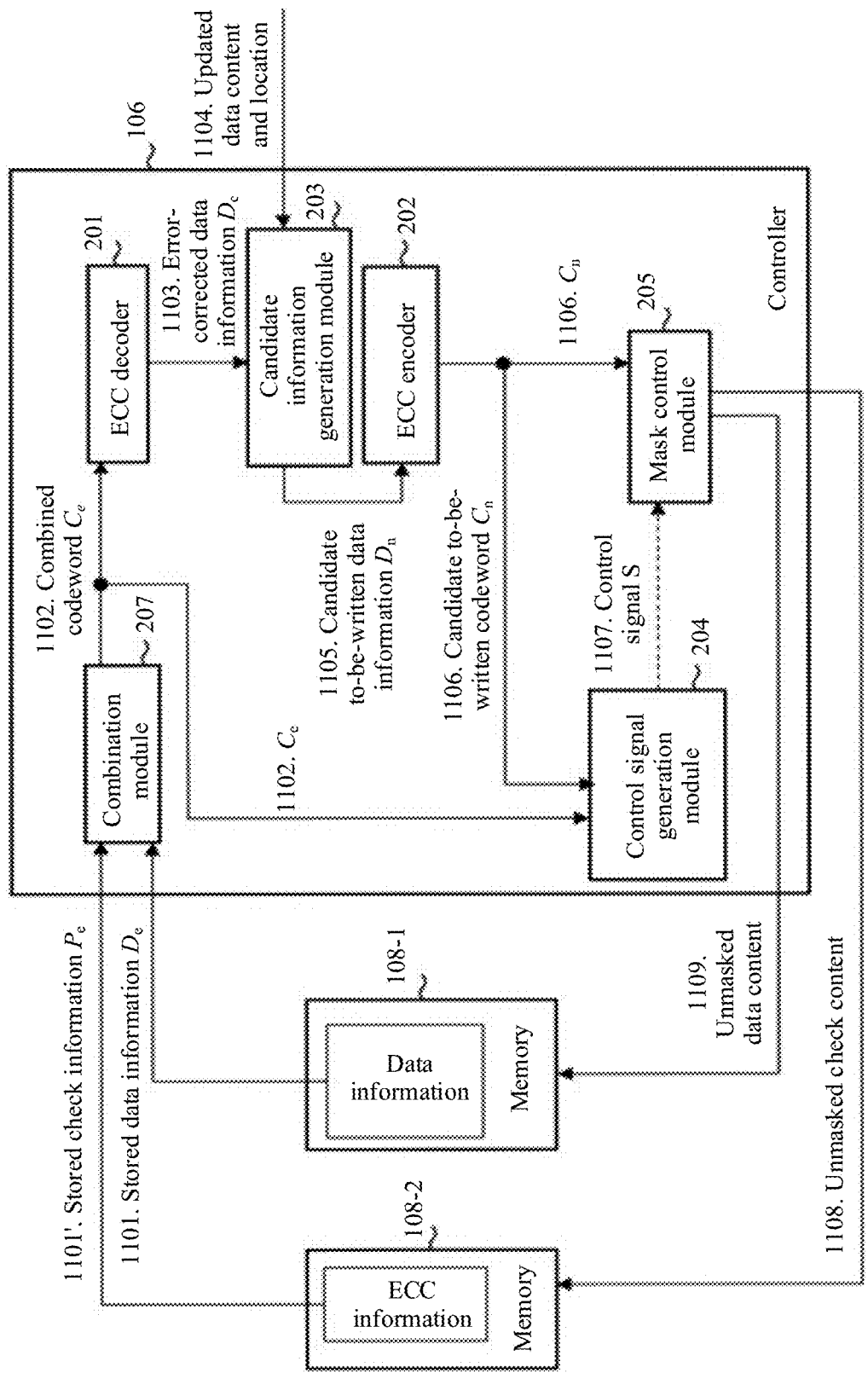
FIG. 11 is another schematic flowchart of a method for updating stored information according to an embodiment of this application.

FIG. 11 is a flowchart of a method for updating stored information according to an embodiment of the present disclosure. A controller that performs the method may be the controller 106 in FIG. 5. That is, the controller 106 includes an ECC decoder 501, an ECC encoder 502, a candidate information generation module 503, a control signal generation module 504, a mask control module 505, and a combination module 507. In the method, a codeword is stored in the manner shown in FIG. 4. That is, data information and ECC check information of the codeword are stored in different memories 108.

A procedure of the embodiment provided in FIG. 11 is similar to the embodiment corresponding to FIG. 7A and the embodiment corresponding to FIG. 9. That is, the controller 106 receives updated data content and data location, and the candidate information generation module 203 generates candidate to-be-written data information based on the updated data content and data location and error-corrected data information. Compared with the embodiment corresponding to FIG. 7A, ECC check information and data information in the embodiment corresponding to FIG. 11 are stored in different memories 108. Compared with the embodiment provided in FIG. 9, the controller 508 in the embodiment shown in FIG. 11 performs mask processing on both candidate to-be-written data information $D_n$ and candidate to-be-written ECC check information $P_n$, such that less data is written into the memory 108. The method provided in FIG. 11 includes the following steps.

Steps 1101, 1101', and 1102 are the same as steps 901, 901', and 902. Details are not described again in this embodiment of the present disclosure.

In addition, the control signal generation module 504 further obtains the combined codeword $C_e$ generated by the combination module 507.

Step 1103: The candidate information generation module 503 obtains the error-corrected data information $D_c$ generated by the ECC decoder 501.

For a detailed description of step 1103, refer to that of step 702. Details are not described herein again in this embodiment of the present disclosure.

Step 1104: The candidate information generation module 503 obtains the updated data content and location, where the updated data content is used to update content at a corresponding location in the stored data information.

For step 1104, refer to step 703 of the method corresponding to FIG. 7A. Details are not described herein again in this embodiment of the present disclosure.

It should be noted that there is no time sequence among steps 1101 and 1101' and step 1104.

Step 1105: The ECC encoder 502 obtains the candidate to-be-written data information $D_n$ generated by the candidate information generation module 503.

Refer to step 704 of the method corresponding to FIG. 7A. Details are not described herein again in this embodiment of the present disclosure.

Steps 1106 and 1107 are the same as steps 705 and 706. Details are not described herein again in this embodiment of the present disclosure.

Descriptions of steps 1108 and 1109 are the same as those of steps 1008 and 1009. Details are not described herein again in this embodiment of the present disclosure.

According to the method, when updating data, after performing ECC error correction on obtained data, the controller 106 combines error-corrected data with the updated data information $D_f$, and then performs masking and writing. This reduces an amount of written data, thereby reducing time and power consumption of a write operation.

It should be noted that, the modules in the controller 106 may perform the steps shown in FIG. 6, FIG. 7A, and FIG. 8 to FIG. 11 in a software-defined manner or using hardware. For example, the candidate to-be-written data information is generated using a candidate information generation circuit (for example, a combination circuit or an exclusive OR circuit). The control signal is generated via a control signal generation circuit (for example, an exclusive OR circuit). The mask operation is performed via a mask control circuit.

The encoder and the decoder may also be implemented in a circuit manner. The exclusive OR circuit may be an XOR circuit.

Figure 12:
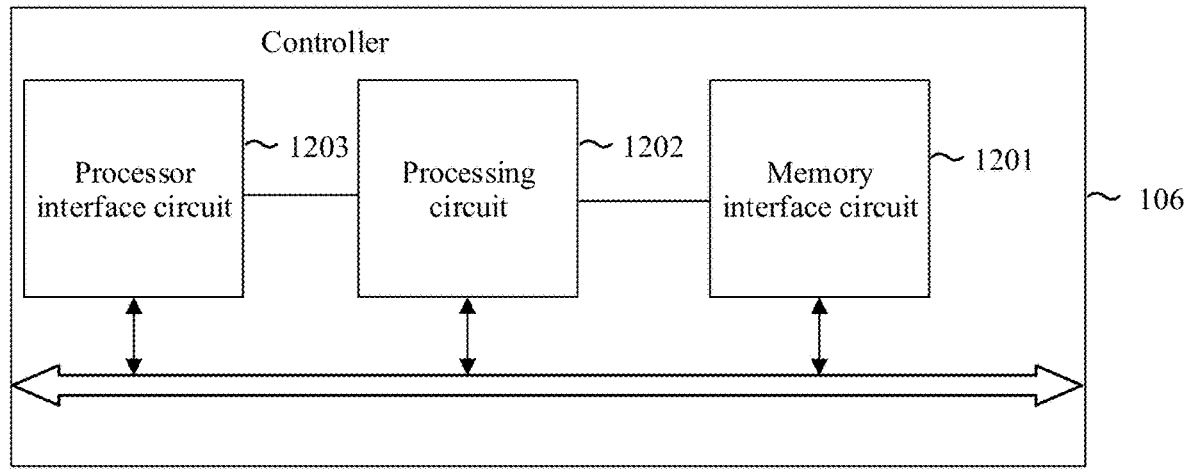
FIG. 12 is another schematic structural diagram of a controller according to an embodiment of this application.

In addition, in the foregoing procedures (for example, the procedures corresponding to FIG. 2, FIG. 6, FIG. 7A, and FIG. 8 to FIG. 11) of the method for updating stored information, a structure of the controller 106 may alternatively be a structure of a controller in FIG. 12. As shown in FIG. 12, the controller 106 includes a memory interface circuit 1201, a processing circuit 1202, and a processor interface circuit 1203. The processor interface circuit 1203 provides an interface between the controller 106 and the processor 110. The controller 106 receives a request from the processor 110 via the processor interface circuit 1203, and sends a processing result of the request to the processor 110.

The memory interface circuit 1201 provides an interface between the controller 106 and the memory 108. A command and an address are transmitted from the controller 106 to the memory 108 via the memory interface circuit 1501, and data is exchanged between the controller 106 and the memory 108. In addition, information stored in the memory 108 is transmitted to the controller 106 via the memory interface circuit 1201.

The processing circuit 1202 obtains an indication from the processor 110 in FIG. 1 via the processor interface circuit 1203 and executes the indication, and executes all the functions executed by the controller 106 in FIG. 2, FIG. 6A, FIG. 7A, and FIG. 8 to FIG. 11.

Figure 13:
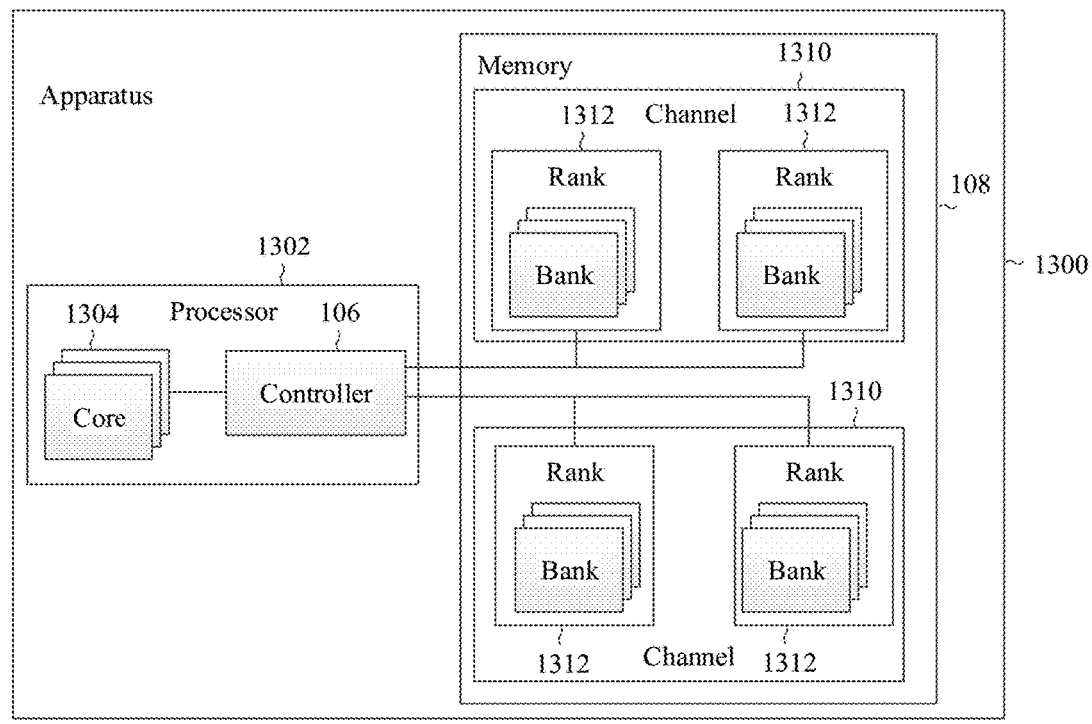
FIG. 13 is another schematic structural diagram of an apparatus that includes a controller according to an embodiment of this application.

FIG. 13 is another schematic structural diagram of an apparatus 1300 that includes a controller according to an embodiment of the present disclosure. The apparatus is configured to implement a method for updating stored information. As shown in FIG. 13, an apparatus 1300 may include at least a processor 1302, a controller 106, and a memory 108. Different from the apparatus 100 shown in FIG. 1, in the apparatus 1300 shown in FIG. 13, the controller 106 and a plurality of processor cores 1304 are integrated into the processor 1302. It should be noted that, in addition to the components shown in FIG. 13, the apparatus 1300 may further include other components such as a communications interface and a disk used as an external storage. This is not limited herein.

The processor 1302 is a computing core and a control core (Control Unit) of the apparatus 1300. The processor 1302 may be a chip, such as a system on chip (SOC). The chip 1302 may further include a plurality of processor cores (core) 1304. The processor 1302 may alternatively be an integrated circuit at an ultra-large scale. The processor core 1304 implements access to the memory 108, a cache, and the disk using an operating system and other software programs. It may be understood that, in this embodiment of the present disclosure, the core 1304 in the processor 1302 may be a central processing unit (CPU), or may be another application-specific integrated circuit (ASIC).

The controller 106 is a bus circuit controller configured to control the memory 108 in the apparatus 1300 and configured to manage and plan data transmission from the memory 108 to the core 1304. Data may be exchanged between the memory 108 and the core 1304 using the controller 106. The controller 106 may be a standalone chip, and is connected to the core 1304 using a system bus. Alternatively, the controller 106 may be integrated into the processor 1302 (as shown in FIG. 13), or may be built into another chip. The controller 106 is configured to perform any step performed by the controller 106 in FIG. 6A, FIG. 7A, and FIG. 8 to FIG. 11. The controller 106 in FIG. 13 may alternatively use any structure in FIG. 5, or FIG. 12.

The memory 108 may be a DRAM 108, including a plurality of channels (channel) 1310. Each channel 1310 may include at least one rank, and each rank may include at least one bank. A person skilled in the art may know that ranks are memory particles (chip) connected to a same chip select signal. The controller 106 can perform a write operation on chips in a same rank, and the chips in the same rank also share a same control signal. The controller 106 may separately access data in a rank in each channel in the DRAM 108 using a memory bus.

It should be noted that the memory 108 shown in FIG. 1 and the memory 108 shown in FIG. 13 are disposed outside the processor. In the embodiments of the present disclosure, the one or more memories 108 may alternatively be integrated into the processor (for example, a memory in a SOC chip), and the controller 106 implements the method for updating stored information by controlling the memory 108 integrated into the processor.

Figure 14:
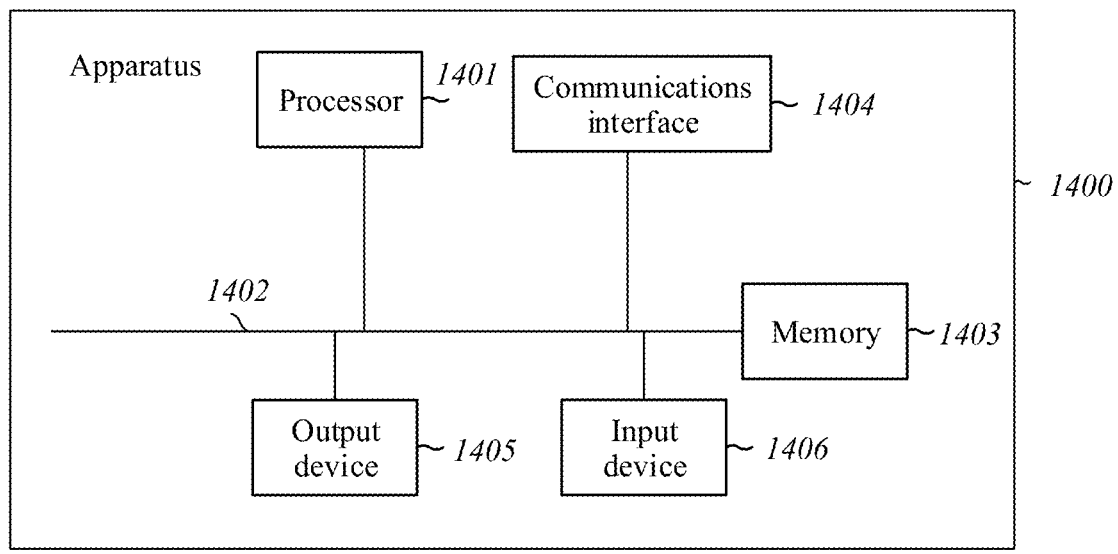
FIG. 14 is another schematic structural diagram of an apparatus for performing a function of a controller according to an embodiment of this application.

FIG. 14 is another schematic structural diagram of an apparatus 1400 for performing a function of a controller according to an embodiment of this application. The apparatus 1400 includes a processor 1401, a communications line 1402, a storage 1403, and at least one communications interface 1404.

The processor 1401 may be a general-purpose CPU, a microprocessor, an ASIC, or one or more integrated circuits configured to control program execution of the solutions in this application. The processor 1401 may execute any function performed by the foregoing controller.

The communications line 1402 may include a path for transmitting information between the foregoing components.

The communications interface 1404 is any apparatus such as a transceiver, and is configured to communicate with another device or a communications network such as the Ethernet, a radio access network (RAN), or a wireless local area network (WLAN).

The storage 1403 may be a memory, such as a ROM, a RAM, or a flash memory Flash. The storage may exist independently and is connected to the processor 1401 using the communications line 1402. Alternatively, the storage 1403 may be integrated into the processor 1401.

The storage 1403 is configured to store a computer executable instruction for executing the solutions of this application, and the processor 1401 controls the execution. The processor 1401 is configured to execute the computer executable instruction stored in the storage 1403, to implement the method for updating stored information provided in the foregoing embodiments of this application.

Optionally, the computer executable instruction in this embodiment of this application may also be referred to as application program code. This is not specifically limited in this embodiment of this application.

In the embodiments of the present disclosure, the controller 106 is presented in a form of functional modules obtained through integration. The "module" herein may be an ASIC, a circuit, a processor that executes one or more software or firmware programs and a storage, an integrated logic circuit, and/or another component that can provide the foregoing function. In a simple embodiment, a person skilled in the art may figure out that the controller 106 may use the form shown in any of FIG. 5, or FIG. 14.

All or some of the foregoing embodiments may be implemented by the controller 106 using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless manner.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, the term "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to example features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A method for updating stored information, the method comprising:
   performing, based on data information and error correction code (ECC) check information, ECC decoding on the data information to generate an error-corrected codeword, wherein the error-corrected codeword comprises error-corrected data information;
   generating candidate to-be-written data information based on the error-corrected data information and a data update indication;
   obtaining, based on the data information and the candidate to-be-written data information, to-be-updated data information by performing a mask operation on the candidate to-be-written data information based on the data information, wherein unmasked content in the candidate to-be-written data information is the to-be-updated data information;
   writing first unmasked content in the candidate to-be-written data information into a memory;
   performing ECC encoding on the candidate to-be-written data information to generate candidate to-be-written ECC check information;
   performing a second mask operation on the candidate to-be-written ECC check information based on the ECC check information; and
   writing second unmasked content in the candidate to-be-written ECC check information into the memory.

2. The method according to claim 1, wherein the data update indication indicates a data location that is to be updated and that is in the data information, wherein the method further comprises generating updated data information based on the data location, and wherein generating the candidate to-be-written data information is further based on the updated data information.

3. The method according to claim 2, wherein generating the candidate to-be-written data information comprises performing exclusive OR processing on the error-corrected data information and the updated data information.

4. The method according to claim 1, wherein the data update indication indicates updated data content and an updated data location, and wherein generating the candidate to-be-written data information comprises replacing data content at a same location in the error-corrected data information with the updated data content based on the updated data location.

5. The method according to claim 1, further comprising performing exclusive OR processing on the data information and the candidate to-be-written data information to generate a mask control signal for the candidate to-be-written data information, wherein performing the mask operation on the candidate to-be-written data information is further based on the mask control signal.

6. The method according to claim 1, further comprising writing the candidate to-be-written ECC check information into a memorythe memory.

7. An apparatus, comprising
   a memory configured to store data information and error correction code (ECC) check information corresponding to the data information; and
   a controller coupled to the memory and configured to:
      perform, based on the data information and the ECC check information, ECC decoding on the data information to generate an error-corrected codeword, wherein the error-corrected codeword comprises error-corrected data information and error-corrected ECC check information;
      generate candidate to-be-written data information based on the error-corrected data information and a data update indication;
      obtain, based on the data information and the candidate to-be-written data information, to-be-updated data information by performing a mask operation on the candidate to-be-written data information based on the data information, and wherein unmasked content in the candidate to-be-written data information is the to-be-updated data information;
      write first unmasked content in the candidate to-be-written data information into the memory;
      perform ECC encoding on updated data information to generate updated ECC check information;
      generate candidate to-be-written ECC check information based on the error-corrected ECC check information and the updated ECC check information;

perform a second mask operation on the candidate to-be-written ECC check information based on the ECC check information; and write second unmasked content in the candidate to-be-written ECC check information into the memory.

8. The apparatus according to claim 7, wherein the data update indication indicates a data location that is to be updated and that is in the data information, wherein the controller is configured to generate updated data information based on the data location, and wherein the controller generates the candidate to-be-written data information based on the error-corrected data information and the updated data information.

9. The apparatus according to claim 8, wherein the controller further generates the candidate to-be-written data information by performing exclusive OR processing on the error-corrected data information and the updated data information.

10. The apparatus according to claim 7, wherein the data update indication indicates updated data content and an updated data location, and wherein the controller generates the candidate to-be-written data information by replacing data content at a same location in the error-corrected data information with the updated data content based on the updated data location.

11. The apparatus according to claim 7, wherein the controller is further configured to generate a mask control signal for the candidate to-be-written data information by performing exclusive OR processing on the data information and the candidate to-be-written data information, and wherein the controller performs the mask operation on the candidate to-be-written data information based on the mask control signal.

12. The apparatus according to claim 7, wherein the controller is further configured to generate the candidate to-be-written ECC check information by performing exclusive OR processing on the error-corrected ECC check information and the updated ECC check information.

13. The apparatus according to claim 7, wherein the controller is further configured to perform exclusive OR processing on the candidate to-be-written ECC check information and the ECC check information to generate a mask control signal for the candidate to-be-written ECC check information, and wherein performing the second mask operation on the candidate to-be-written ECC check information is further based on the mask control signal.

14. The apparatus according to claim 7, further comprising writing the candidate to-be-written ECC check information into the memory.

15. An apparatus, comprising:
a controller; and
a core processor configured to exchange data with a memory via the controller,
wherein the controller is configured to:
perform, based on data information and error correction code (ECC) check information, ECC decoding on the data information to generate an error-corrected codeword, wherein the error-corrected codeword comprises error-corrected data information;

generate candidate to-be-written data information based on the error-corrected data information and a data update indication;

obtain, based on the data information and the candidate to-be-written data information, to-be-updated data information by performing a mask operation on the candidate to-be-written data information based on the data information, wherein unmasked content in the candidate to-be-written data information is the to-be-updated data information;

write first unmasked content in the candidate to-be-written data information into the memory;

perform ECC encoding on the candidate to-be-written data information to generate candidate to-be-written ECC check information;

perform a second mask operation on the candidate to-be-written ECC check information based on the ECC check information; and write second unmasked content in the candidate to-be-written ECC check information into the memory.

16. The apparatus according to claim 15, wherein the data update indication indicates a data location that is to be updated and that is in the data information, and wherein the controller is further configured to generate updated data information based on the data location, and wherein generating the candidate to-be-written data information is further based on the updated data information.

17. The apparatus according to claim 16, wherein the controller is further configured to generate the candidate to-be-written data information by performing exclusive OR processing on the error-corrected data information and the updated data information.

18. The apparatus according to claim 15, wherein the data update indication indicates updated data content and an updated data location, and wherein the controller is further configured to generate the candidate to-be-written data information by replacing data content at a same location in the error-corrected data information with the updated data content based on the updated data location.

19. The apparatus according to claim 15, wherein the controller is further configured to perform exclusive OR processing on the data information and the candidate to-be-written data information to generate a mask control signal for the candidate to-be-written data information, and wherein performing the mask operation on the candidate to-be-written data information is further based on the mask control signal.

20. The apparatus according to claim 15, further comprising writing the candidate to-be-written ECC check information into the memory.

* * * * *